United States Patent
Momo et al.

(10) Patent No.: US 12,086,181 B2
(45) Date of Patent: Sep. 10, 2024

(54) DOCUMENT RETRIEVAL SYSTEM AND METHOD FOR RETRIEVING DOCUMENT

(71) Applicant: Semiconductor Energy Laboratory Co., Ltd., Kanagawa-ken (JP)

(72) Inventors: Junpei Momo, Kanagawa (JP); Kazuki Higashi, Kanagawa (JP); Motoki Nakashima, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 17/791,316

(22) PCT Filed: Dec. 28, 2020

(86) PCT No.: PCT/IB2020/062467
§ 371 (c)(1),
(2) Date: Jul. 7, 2022

(87) PCT Pub. No.: WO2021/140406
PCT Pub. Date: Jul. 15, 2021

(65) Prior Publication Data
US 2023/0350949 A1     Nov. 2, 2023

(30) Foreign Application Priority Data
Jan. 10, 2020    (JP) ................................ 2020-003074

(51) Int. Cl.
*G06F 16/00*    (2019.01)
*G06F 16/33*    (2019.01)
(Continued)

(52) U.S. Cl.
CPC ...... *G06F 16/9024* (2019.01); *G06F 16/3344* (2019.01); *G06F 16/93* (2019.01); *G06F 40/211* (2020.01); *G06F 40/284* (2020.01)

(58) Field of Classification Search
CPC .. G06F 16/9024; G06F 16/3344; G06F 16/93; G06F 40/211; G06F 40/284
See application file for complete search history.

(56) References Cited

U.S. PATENT DOCUMENTS

2009/0012842 A1 *   1/2009  Srinivasan .......... G06F 16/3344
                                                            707/999.005
2009/0307213 A1 *  12/2009  Deng .................... G06F 16/35
                                                            707/999.005
(Continued)

FOREIGN PATENT DOCUMENTS

JP      08-044763 A     2/1996
JP      2005-258624 A   9/2005
(Continued)

OTHER PUBLICATIONS

International Search Report (Application No. PCT/IB2020/062467) Dated Mar. 30, 2021.

(Continued)

*Primary Examiner* — Syed H Hasan
(74) *Attorney, Agent, or Firm* — Husch Blackwell LLP

(57) ABSTRACT

A document retrieval system retrieving a document with the concept of the document taken into account is provided. The system includes a processing portion and the processing portion creates a retrieval graph from a retrieval composition. The retrieval graph includes first to m-th retrieval local graphs (m is an integer of greater than or equal to 1), and the retrieval local graphs are each constituted by two nodes and one edge. The processing portion performs retrieval of first to m-th sentences on a reference document. The i-th sentence (i is an integer of greater than or equal to 1 and less than or equal to m) includes one of the two nodes in the i-th retrieval local graph or a related term or a hyponym of the one of the two nodes; the other of the two nodes in the i-th retrieval local graph or a related term or a hyponym of the (Continued)

other of the two nodes; and the edge in the i-th retrieval local graph or a related term or a hyponym of the edge. A mark is assigned to the score of the reference document in accordance with the number of sentences included in the reference document among the first to m-th sentences.

7 Claims, 17 Drawing Sheets

(51) Int. Cl.
*G06F 16/901* (2019.01)
*G06F 16/93* (2019.01)
*G06F 40/211* (2020.01)
*G06F 40/284* (2020.01)

(56) References Cited

U.S. PATENT DOCUMENTS

2010/0153090 A1* 6/2010 Chen ............... G06F 40/30
707/706
2012/0035912 A1* 2/2012 Litvak ............... G06F 16/345
704/8
2020/0409963 A1 12/2020 Higashi et al.
2022/0207070 A1 6/2022 Higashi et al.

FOREIGN PATENT DOCUMENTS

| JP | 2010-205265 A | 9/2010 |
|----|---------------|--------|
| JP | 2013-033452 A | 2/2013 |
| KR | 2010-0100231 A | 9/2010 |
| WO | WO 2016/067334 A1 | 5/2016 |
| WO | WO 2021/079230 A1 | 4/2021 |

OTHER PUBLICATIONS

Written Opinion (Application No. PCT/IB2020/062467) Dated Mar. 30, 2021.

* cited by examiner

FIG. 4A
SANKABUTSUHANDOUTAISOU HA ZETSUENTAISOU NO JOUHOU NI ARU
FIG. 4B
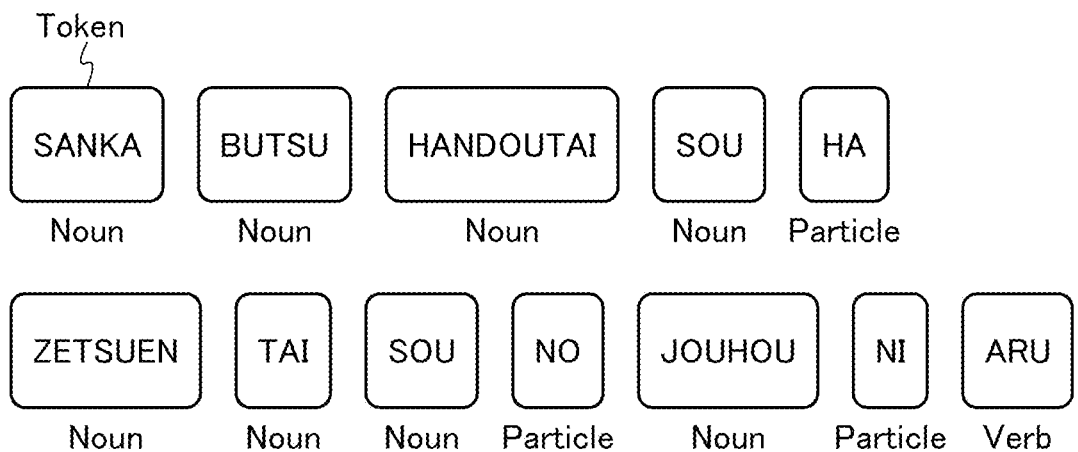
FIG. 4C
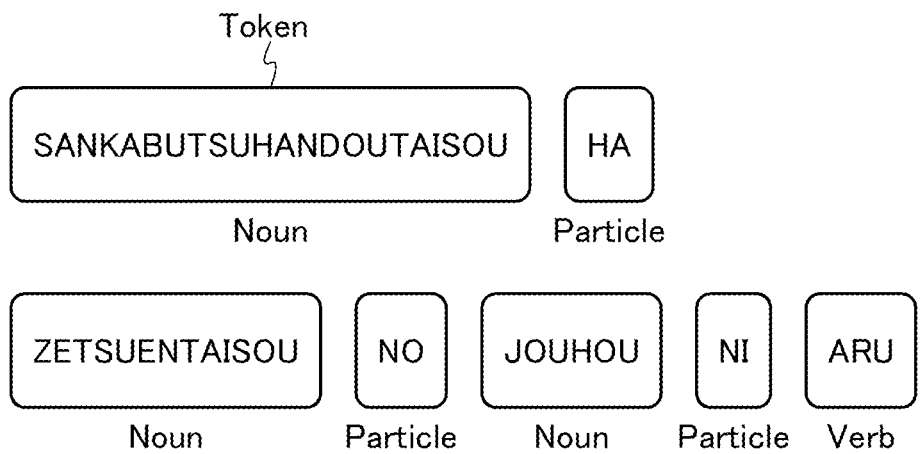

FIG. 6A
A semiconductor device comprising:
an oxide semiconductor layer over an insulator layer.
FIG. 6B
A semiconductor device comprising
an oxide semiconductor layer over an insulator layer.
FIG. 6C
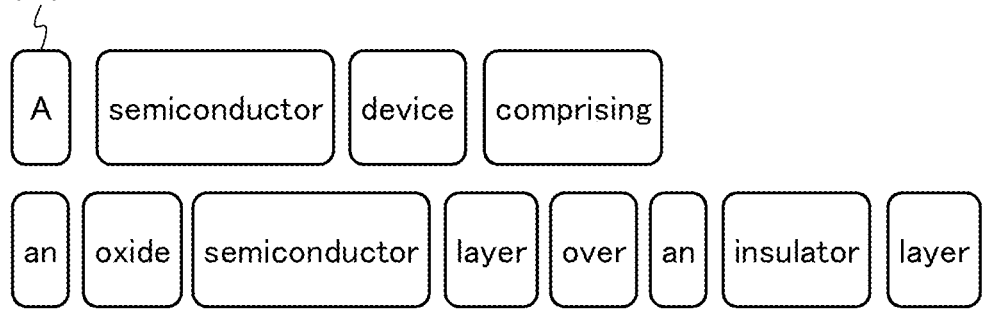
FIG. 6D
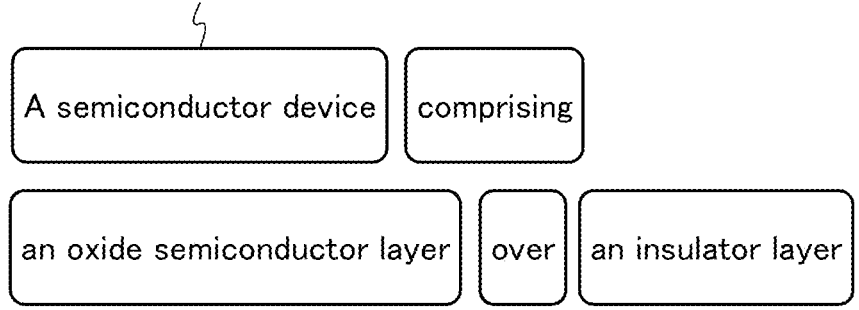

| Reference document | 30_1 | 30_2 | 30_3 | 61 |
|---|---|---|---|---|
| 40a | 41a_5 | 41a_6 | 41a_8 | 1.00 |
| 40b | 41b_5 | 41b_6 | × | 0.67 |
| 40c | 41c_2 | 41c_6 | × | 0.67 |
| 40d | 41d_2 | × | × | 0.33 |

FIG. 13A

| Reference document | 30_1 | 30_2 | r | 62 |
|---|---|---|---|---|
| 40a | 41a_5 | 41a_6 | 0 | 1.00 |
| 40b | 41b_5 | 41b_6 | 0 | 1.00 |
| 40c | 41c_2 | 41c_6 | 3 | 0.63 |
| 40d | 41d_2 | × | - | 0.00 |

FIG. 13B

| Reference document | 30_1 | 32A_1 | 63 | 64A | 64B |
|---|---|---|---|---|---|
| 40a | 41a_5 | A1 | 1.00 | 1.00 | 1.00 |
| 40b | 41b_5 | A11 | 0.50 | 0 | 0.50 |
| 40c | 41c_2 | A0 | 0.50 | 0.50 | 0 |
| 40d | 41d_2 | A22 | 0.25 | 0 | 0 |

DOCUMENT RETRIEVAL SYSTEM AND METHOD FOR RETRIEVING DOCUMENT

This application is a 371 of international application PCT/IB2020/062467 filed on Dec. 28, 2020 which is incorporated herein by reference.

TECHNICAL FIELD

One embodiment of the present invention relates to a document retrieval system. Another embodiment of the present invention relates to a method for retrieving a document.

BACKGROUND ART

A variety of retrieval technologies for retrieving documents have been provided. In conventional document retrieval, word (character string) search is mainly used. For example, PageRank and the like are utilized for web pages, and thesauruses are utilized in the field of patents. Furthermore, there are methods for expressing similarities of compositions by making sets of words and using the Jaccard coefficient, the Sorensen-Dice coefficient, the Szymkiewicz-Simpson coefficient, or the like. In addition, there is a method in which compositions are vectorized with the use of tf-idf, Bag of Words (BoW), Doc2Vec, or the like and cosine similarities are compared. In addition, there is a method in which a desired document is retrieved by evaluating similarities of character strings in compositions with the use of the Hamming distance, the Levenshtein distance, the Jaro-Winkler distance, or the like. Patent Document 1 discloses a language processing apparatus that compares similarities between sentences by converting structural units of the sentences into string structures and calculating the distance between the string structures.

REFERENCE

Patent Document

[Patent Document 1] Japanese Published Patent Application No. 2005-258624

SUMMARY OF THE INVENTION

Problems to be Solved by the Invention

For documents of a variety of fields to be searched through, a document retrieval method with higher precision is desired. In documents such as patent documents (e.g., specification and scope of claims) and contracts, for example, similar words are heavily used in many cases. Thus, it is important for a retrieval technology to take not only words used in the document but also the concept of the document (generalized meaning and content) into account.

Thus, an object of one embodiment of the present invention is to provide a document retrieval system that takes the concept of a document into account. Another object of one embodiment of the present invention is to provide a method for retrieving a document with the concept of the document taken into account.

Note that the description of these objects does not preclude the existence of other objects. One embodiment of the present invention does not have to achieve all the objects. Note that other objects will be apparent from the descriptions of the specification, the drawings, the claims, and the like, and other objects can be derived from the descriptions of the specification, the drawings, the claims, and the like.

Means for Solving the Problems

One embodiment of the present invention is a document retrieval system that includes a processing portion. The processing portion has a function of creating a graph from a composition. A retrieval graph is created from a retrieval composition. The retrieval graph includes first to m-th retrieval local graphs (m is an integer of greater than or equal to 1). Each of the first to m-th retrieval local graphs is constituted by two nodes and an edge between the two nodes. The processing portion further has a function of retrieving first to m-th sentences from a reference document. The i-th sentence (i is an integer of greater than or equal to 1 and less than or equal to m) includes a (3i−2)-th word, a (3i−1)-th word, and a 3i-th word. The (3i−2)-th word is one of the two nodes in the i-th retrieval local graph, a related term of the one of the two nodes, or a hyponym of the one of the two nodes. The (3i−1)-th word is the other of the two nodes in the i-th retrieval local graph, a related term of the other of the two nodes, or a hyponym of the other of the two nodes. The 3i-th word is the edge in the i-th retrieval local graph, a related term of the edge, or a hyponym of the edge. The processing portion further has a function of assigning a first mark to a score of the reference document in accordance with the number of sentences included in the reference document among the first to m-th sentences.

In the above document retrieval system, the processing portion preferably has a function of assigning, when the reference document includes the j-th sentence (j is an integer of greater than or equal to 1 and less than or equal to m) and the k-th sentence (k is an integer of greater than or equal to 1 and less than or equal to m other than j), a second mark to the score of the reference document in accordance with a distance between the j-th sentence and the k-th sentence; and a function of calculating the score of the reference document in accordance with the mark assigned to the score of the reference document.

In the above document retrieval system, the processing portion preferably has a function of assigning a third mark to the score of the reference document in accordance with conceptual closeness between a (3j−2)-th word included in the j-th sentence and a word from which one of the two nodes in the j-th retrieval local graph is made.

In the above document retrieval system, the processing portion preferably has a function of extracting, from a plurality of reference documents, a reference document including a (3l−2)-th word and a (3l−1)-th word included in the l-th sentence (l is an integer of greater than or equal to 1 and less than or equal to m).

In the above document retrieval system, the processing portion's function of creating a graph from a composition preferably includes a function of dividing the composition into a plurality of tokens, a function of performing syntactic analysis, a function of connecting some of the tokens in accordance with a result of the syntactic analysis, a function of evaluating a connection relation between the tokens in accordance with the result of the syntactic analysis, and a function of building the graph from the connection relation between the tokens.

In the above document retrieval system, it is preferable that the processing portion's function of creating a graph from a composition further include a function of replacing a token having a representative word or a hypernym by the representative word or the hypernym.

It is preferable that the above document retrieval system include an input portion in addition to the processing portion and the input portion have a function of supplying the retrieval composition to the processing portion.

It is preferable that the above document retrieval system include an output portion in addition to the processing portion and the input portion and the output portion have a function of supplying the score of the reference document.

Effect of the Invention

According to one embodiment of the present invention, a document retrieval system that takes the concept of a document into account can be provided. According to another embodiment of the present invention, a method for retrieving a document with the concept of the document taken into account can be provided.

Note that the effects of embodiments of the present invention are not limited to the effects listed above. The effects listed above do not preclude the existence of other effects. Note that the other effects are effects that are not described in this section and will be described below. The effects that are not described in this section can be derived from the descriptions of the specification, the drawings, and the like and can be extracted from these descriptions by those skilled in the art. Note that one embodiment of the present invention has at least one of the effects listed above and/or the other effects. Accordingly, depending on the case, one embodiment of the present invention does not have the effects listed above in some cases.

BRIEF DESCRIPTION OF THE DRAWINGS

FIG. 4A to FIG. 4C are diagrams showing results obtained in each step.

FIG. 6A to FIG. 6D are diagrams showing results obtained in each step.

FIG. 13A and FIG. 13B are diagrams showing results obtained in each step.

MODE FOR CARRYING OUT THE INVENTION

Figure 1:
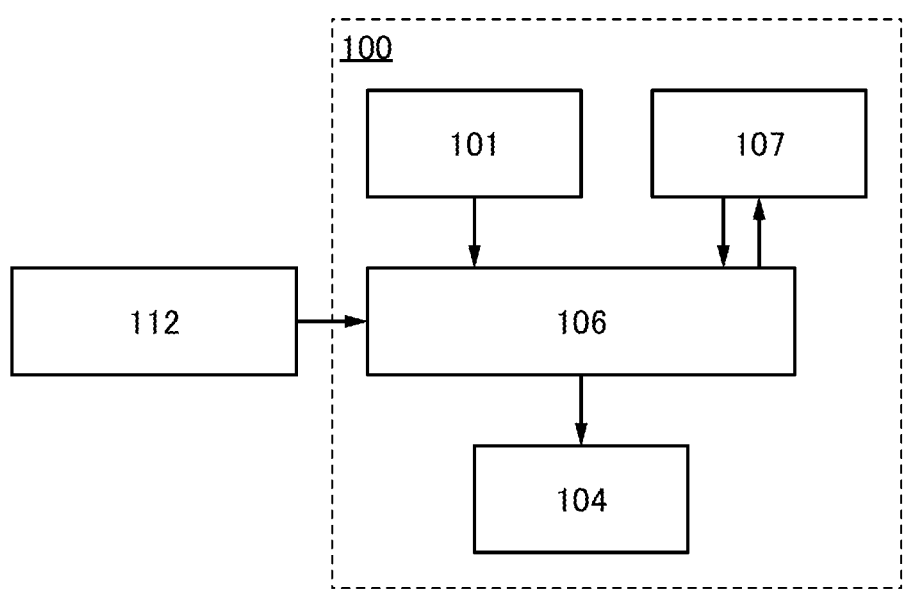
FIG. 1 is a diagram showing an example of a document retrieval system.

Embodiments will be described in detail with reference to the drawings. Note that the present invention is not limited to the following description, and it will be readily understood by those skilled in the art that modes and details of the present invention can be modified in various ways without departing from the spirit and scope of the present invention. Thus, the present invention should not be construed as being limited to the description of embodiments below.

Note that in structures of the invention described below, the same reference numerals are used in common for the same portions or portions having similar functions in different drawings, and a repeated description thereof is omitted. Furthermore, the same hatch pattern is used for the portions having similar functions, and the portions are not especially denoted by reference numerals in some cases.

In addition, the position, size, range, or the like of each structure shown in drawings does not represent the actual position, size, range, or the like in some cases for easy understanding. Therefore, the disclosed invention is not necessarily limited to the position, size, range, or the like disclosed in the drawings.

Furthermore, ordinal numbers such as "first", "second", and "third" used in this specification are used in order to avoid confusion among components, and the terms do not limit the components numerically.

In this specification and the like, a "composition" refers to what is constituted by one or more "sentences". Accordingly, a "composition" encompasses a "sentence". A "document" sometimes refers to a group of records represented by characters. In this specification and the like, a "document" sometimes refers to part or the whole of a composition included in the document. That is, a "composition" can be used in place of the term "document". Furthermore, part or the whole of a composition included in a document is sometimes simply referred to as a "composition".

In this specification and the like, a "composition" or a "document" sometimes refers to a set of pieces of character information or character codes that can be processed and transmitted in an information processing device such as a server or a personal computer. Note that the set is sometimes referred to as text data.

Embodiment 1

In this embodiment, a document retrieval system and a method for retrieving a document of embodiments of the present invention are described with reference to FIG. 1 to FIG. 15.

<Document Retrieval System>

FIG. 1 is a diagram showing a structure of a document retrieval system 100.

The document retrieval system 100 can be provided in an information processing device such as a personal computer used by the user. Alternatively, a processing portion of the document retrieval system 100 can be provided in a server to be used by access from a client PC via a network.

The document retrieval system 100 includes at least a processing portion 106. The document retrieval system 100 shown in FIG. 1 includes the processing portion 106, an input portion 101, a memory portion 107, and an output portion 104. The document retrieval system 100 is connected to a concept dictionary 112 via a network.

The processing portion 106 has a function of creating a graph from a composition. The composition is a composition (also referred to as a retrieval composition, a query composition, or the like) specified by the user for retrieval and a composition included in a document that is a retrieval object (also referred to as a reference document). Note that the graph created from the composition specified by the user for retrieval is also referred to as a retrieval graph, a query graph, or the like.

A graph is constituted by a set of nodes (also referred to as a node group) and a set of edges (also referred to as an edge group) representing a connection relation between nodes. The node group includes two or more nodes. The edge group includes one or more edges. Note that a case of including one edge is sometimes described with an "edge group".

The graph is preferably a directed graph. A directed graph is a graph constituted by a node group and an edge group with directions. Furthermore, the graph is preferably a directed graph with labeled nodes and labeled edges. The use of a directed graph with labels can improve the precision in retrieval. A weight may be set to the node and/or edge included in the graph. Setting a weight to the node and/or edge enables retrieval of a document desired by the user. Note that the graph may be an undirected graph.

The processing portion 106 preferably has a function of performing morphological analysis, a function of performing syntactic analysis, an abstraction function, and a function of building a graph, for example. The processing portion 106 also has a function of referring to the concept dictionary 112. With reference to the concept dictionary 112, the processing portion 106 creates a graph from a composition.

The function of performing morphological analysis and/or the function of performing syntactic analysis may be provided in a device different from the document retrieval system 100. In that case, it is preferable that the document retrieval system 100 transmit the composition to the device, receive results of the morphological analysis and/or syntactic analysis performed in the device, and then transmit the received data to the processing portion 106.

The processing portion 106 has a function of analyzing a reference document. The processing portion 106 has a function of evaluating a reference document. For example, the processing portion 106 preferably has a function of assigning a mark to the score of a reference document. The processing portion 106 has a function of extracting a reference document.

The input portion 101 is used to input a composition. The input portion 101 has a function of supplying the composition to the processing portion 106. The composition is a composition specified by the user for retrieval. The composition is text data. The composition may be audio data or image data. Examples of the input portion 101 include input devices such as a keyboard, a mouse, a touch sensor, a microphone, a scanner, and a camera.

The document retrieval system 100 may have a function of converting audio data into text data. The processing portion 106 may have the function, for example. Alternatively, the document retrieval system 100 may further include an audio-text conversion portion having the function.

The document retrieval system 100 may have an optical character recognition (OCR) function. This enables characters contained in image data to be recognized and text data to be created. The processing portion 106 may have the function, for example. Alternatively, the document retrieval system 100 may further include a character recognition portion having the function.

The memory portion 107 stores a plurality of reference documents. The plurality of reference documents may be stored in the memory portion 107 through the input portion 101, a memory medium, communication, or the like.

The plurality of reference documents stored in the memory portion 107 are preferably text data. In another example, in which the plurality of reference documents stored in the memory portion 107 are audio data or image data, the data size can be reduced by converting character information included in the audio data or the image data into text data. Accordingly, an increase in memory capacity of the memory portion 107 can be reduced when the memory portion 107 stores text data.

The memory portion 107 may store a composition that has been input with the use of the input portion 101. Furthermore, the graph created in the processing portion 106 from the composition may be stored as text data, image data, or the like.

The output portion 104 has a function of outputting information. The information refers to a result of evaluation of the reference document by the processing portion 106. For example, the information is the score of the reference document. Alternatively, the information is the reference document with the highest score. Further alternatively, the information is ranking data obtained by ranking based on scores.

The information is output to the output portion 104 as, for example, visual information such as a character string, a numerical value, or a graph, audio information, or the like. Examples of the output portion 104 include output devices such as a display and a speaker.

The document retrieval system 100 may have a function of converting text data into audio data. The document retrieval system 100 may further include a text-audio conversion portion having the function, for example.

The concept dictionary 112 is a list to which the categories of words, relations with other words, and the like are added. The concept dictionary 112 may be an existing concept dictionary. Alternatively, a concept dictionary tailored to the field of a retrieval composition or a reference document may be created. Further alternatively, words that are often used in the field of a retrieval composition or a reference document may be added to a general-purpose concept dictionary.

Although FIG. 1 shows a structure where the concept dictionary 112 is provided in a device different from the document retrieval system 100, one embodiment of the present invention is not limited to this. The concept dictionary 112 may be provided in the document retrieval system 100.

The above is the description of the structure of the document retrieval system 100. With the use of the document retrieval system of one embodiment of the present invention, a document that is similar to a composition can be retrieved from the plurality of reference documents with the concept of the composition taken into account. A listing of documents that are similar to the composition can be made from the plurality of reference documents. A document that is similar to a composition refers to, for example, a document that is determined to be (broadly) equivalent in meaning to the composition even though including different words. In the case where two compositions in different languages have the same concept, the same graph is created from the two compositions. Accordingly, the use of the document retrieval system of one embodiment of the present invention facilitates retrieval of a document from documents in a different language.

One embodiment of the present invention can provide a document retrieval system that takes the concept of a document into account.

<Method for Retrieving Document>

Figure 2:
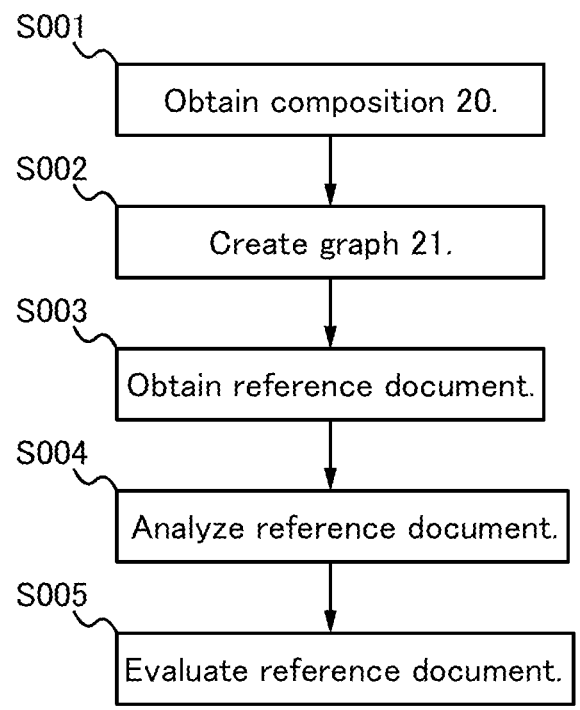
FIG. 2 is a flowchart showing an example of a document retrieval method.

FIG. 2 is a flowchart illustrating the flow of processing executed by the document retrieval system 100. That is, FIG. 2 is a flowchart showing an example of a method for retrieving a document of one embodiment of the present invention.

A method for retrieving a document of one embodiment of the present invention is described. In the method, a reference document is analyzed and evaluated on the basis of a graph created from a composition. The method for retrieving a document is described with reference to FIG. 2.

The method for retrieving a document has Step S001 to Step S005 as shown in FIG. 2.

[Step S001]

Step S001 is a step of obtaining a composition 20. The composition 20 is a composition supplied from the input portion 101 to the processing portion 106. The composition 20 is a composition specified by the user for retrieval. In the case where data of the composition 20 is data (audio data or image data) other than text data, the audio data or the image data is converted into text data before the process proceeds to Step S002. The conversion from the audio data into the text data is preferably performed using the processing portion 106's function of converting audio data into text data or using an audio-text conversion portion. The conversion from the image data into the text data is preferably performed using the processing portion 106's optical character recognition (OCR) function or using a character recognition portion.

In the case where the composition 20 is scope of claims, the composition 20 may be subjected to cleaning processing before the process proceeds to Step S002. The cleaning processing removes noise contained in the composition. The cleaning processing includes, for example, deletion of semicolons, conversion of colons into commas, and the like. Performing the cleaning processing on the composition can improve the precision of morphological analysis. Also when the composition 20 is a claim, the cleaning processing may be performed on the composition 20 before the process proceeds to Step S002.

Note that the cleaning processing is preferably performed as necessary even in the case where the composition 20 is neither scope of claims nor a claim. Furthermore, the composition 20 may be stored in the memory portion 107 after the cleaning processing is performed.

[Step S002]

Figure 3:
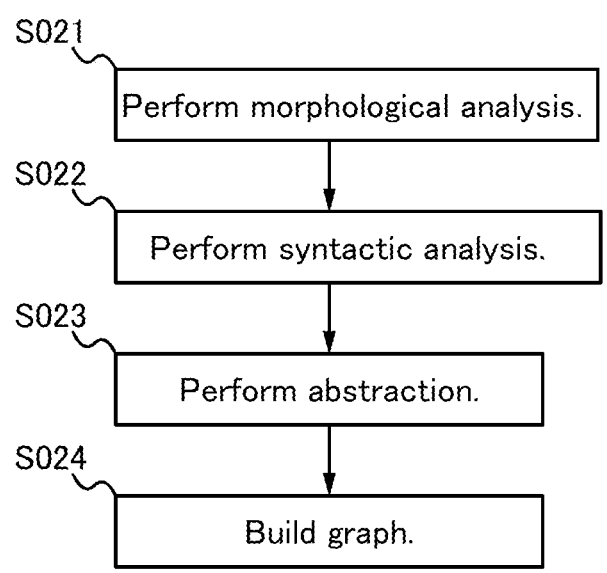
FIG. 3 is a flowchart showing an example of a graph creating process.

Step S002 is a process of creating a graph 21 from the composition 20. FIG. 3 is a flowchart showing an example of a process of creating a graph from a composition. Step S002 includes Step S021 to Step S024 shown in FIG. 3. To describe Step S002, a description is made using Step S021 to Step S024.

Step S021 is a step in which the processing portion 106 performs morphological analysis on the composition. As a result, the composition is divided into morphemes (words). In this specification, divided morphemes (words) may be referred to as tokens.

It is preferable that in Step S021, the part of speech of each of the tokens be determined and each of the tokens be associated with a part of speech label. When tokens are associated with part of speech labels, the precision of syntactic analysis can be improved. Note that in this specification and the like, associating a token with a part of speech label can be rephrased as giving a part of speech to a token.

In the case where the processing portion 106 does not have a function of performing morphological analysis, a morphological analysis program (also referred to as a morphological analyzer) incorporated in a device different from the document retrieval system may be used to perform morphological analysis on the composition. In that case, Step S021 is a step of transmitting the composition to the device, performing morphological analysis in the device, and receiving the morphological analysis result.

Step S022 is a step in which the processing portion 106 performs syntactic analysis. In other words, Step S022 is a step of combining some of a plurality of tokens in accordance with the dependency of the tokens. In the case where tokens satisfy a certain condition, for example, the tokens satisfying the condition are combined to generate a new token. This reduces the number of tokens, allowing a reduction in the number of processings in later steps. Accordingly, a reduced load on a central processing unit and a memory, a shortened retrieval time, and the like can be achieved. In addition, the document retrieval system 100 can be provided in an information processing device such as a personal computer used by the user or a small-scale server.

In a composition where the Japanese language is used, specifically, in the case where a first token is a noun and a token right before the first token is an adjective, the token right before the first token and the first token are combined to generate a new token. In the case where the first token is a noun and a token right after the first token is a noun, the first token and the token right after the first token are combined to generate a new token.

Note that the above-described condition is preferably set as appropriate in accordance with the language used in a composition.

The syntactic analysis preferably includes compound analysis. This syntactic analysis enables some of the plurality of tokens to be combined and a compound to be generated as a new token. Thus, even when the composition includes a compound that is not registered in the concept dictionary 112, the division of the composition into tokens can be performed with high precision. The generated compound may be added to the concept dictionary 112. In this manner, the efficiency of division of the composition into tokens can be increased.

Step S022 includes not only the above-described step of combining some of the plurality of tokens but also a step of evaluating a connection relation between the tokens. Note that the step of evaluating the connection relation between the tokens is preferably performed after the above-described step of combining some of the plurality of tokens.

In the step of evaluating the connection relation between the tokens, for example, a subject, an object, and a predicate that may be included in a sentence are searched for.

For example, in the case where the Japanese language is used in a composition, a sentence is written by arranging a subject, an object, and a predicate (e.g., a verb, an adjective, an adjectival noun, or a combination of a noun and a particle) in this order. In view of this, a token that is a subject, a token that is an object, and a token that is a predicate are searched for in this order. In the case where these tokens are included in the sentence, it is preferable that the token that is the subject and the token that is the object be extracted as nodes and the token that is the predicate be extracted as an edge.

For example, in the case where the English language is used in a composition, a sentence is written by arranging a subject, a predicate (a verb), and an object in this order. In view of this, a token that is a subject, a token that is a predicate (a verb), and a token that is an object are searched for in this order. In the case where these tokens are included in the sentence, it is preferable that the token that is the subject and the token that is the object be extracted as nodes and the token that is the predicate (the verb) be extracted as an edge.

Since the order of arranging a subject, an object, and a predicate depends on the language used in a composition as described above, adjustment appropriate for each language is preferably made.

A token that is a preposition and is included between the first token and a second token may be searched for, for example. In the case where the sentence includes the token that is the preposition, it is preferable that the first token and the second token be extracted as nodes and the token that is the preposition be extracted as an edge.

In addition, a token that is a determiner is preferably also searched for, for example. A determiner is placed before a noun to clarify what the noun refers to. Accordingly, searching for the token that is the determiner enables determining a relation between a noun right after the determiner and a noun written before the determiner. It is thus possible to determine whether these nouns are the same node.

Note that some parts of speech do not exist in certain languages. Thus, the above-described condition is preferably set as appropriate in accordance with the language used in a composition.

In the case where the processing portion 106 does not have a function of performing syntactic analysis, a syntactic analysis program (also referred to as a syntactic analyzer) incorporated in a device different from the document retrieval system may be used to perform syntactic analysis. In that case, Step S022 is a step of transmitting tokens to the device, performing syntactic analysis in the device, and receiving the syntactic analysis result.

Step S023 is a step in which the processing portion 106 abstracts tokens. The tokens are the tokens extracted in Step S022 as the nodes and the edge. For example, a word included in the token is analyzed to obtain a representative word. When the representative word has a hypernym, the hypernym is obtained. Then, the token is replaced by the obtained representative word or the obtained hypernym. Here, a representative word is a headword (also referred to as a lemma) of a group of synonyms. A hypernym is a representative word that corresponds to a superordinate concept of a representative word. That is, abstraction of a token refers to replacement of the token by a representative word or a hypernym. Note that in the case where the token is a representative word or a hypernym, that token does not have to be replaced.

The hypernym replacing the token is preferably one or two levels higher than the token at the maximum, and more preferably one level higher than the token at the maximum. Note that the highest level at which the hypernym replacing the token is may be specifiable. This can inhibit the token from being changed into an excessively superordinate concept and from deviating from the concept of a composition. In addition, the number of processings in the step of abstracting the token can be reduced. Accordingly, a reduced load on the central processing unit and the memory, a shortened retrieval time, and the like can be achieved. In addition, the document retrieval system 100 can be provided in an information processing device such as a personal computer used by the user or a small-scale server.

The appropriate degree of abstraction of a token depends on the field. Thus, abstraction of a token is preferably performed through machine learning in accordance with the field. Abstraction of a token is performed in such a manner that the token or one of tokens obtained by dividing the token again is vectorized and classified by a classifier, for example. Note that an algorithm such as a decision tree, support-vector machines, random forests, or a multilayer perceptron may be used as the classifier. Specifically, "oxide semiconductor", "amorphous semiconductor", "silicon semiconductor", and "GaAs semiconductor" are preferably classified into "semiconductor". Furthermore, "oxide semiconductor layer", "oxide semiconductor film", "amorphous semiconductor layer", "amorphous semiconductor film", "silicon semiconductor layer", "silicon semiconductor film", "GaAs semiconductor layer", and "GaAs semiconductor film" are also preferably classified into "semiconductor".

In addition, a token may be classified by the classifier in accordance with a plurality of tokens obtained by dividing the token again. In the case where a token "SANKABUT-SUHANDOUTAISOU" is abstracted, for example, tokens that are obtained by dividing the token into morphemes again ("SANKA", "BUTSU", "HANDOUTAI", and "SOU") are input to the classifier. After the input to the classifier, when the classifier classifies the token into "HANDOUTAI", the token is replaced by "HANDOUTAI". In this way, the token can be abstracted.

Other than the above machine learning algorithms, conditional random field (CRF) may be used. Alternatively, CRF and the above method may be combined.

Abstracting a token enables grasping the concept of a composition. Thus, neither the structure nor the expression of a composition is likely to affect composition retrieval. In other words, retrieval can be performed in accordance with the concept of the composition.

To obtain a representative word and a hypernym, a concept dictionary may be used or classification by machine learning may be carried out. As the concept dictionary, the concept dictionary 112 provided in a device different from the document retrieval system 100 may be used, or a concept dictionary provided in the document retrieval system 100 may be used.

Step S024 is a step in which the processing portion 106 builds a graph. In other words, Step S024 is a step of building a graph with the use of the tokens that have been prepared by the end of Step S023. For example, in the case where a composition includes the first token and the second token that are noun phrases and a third token that expresses the connection relation between the first token and the second token, a graph is built where each of the first token and the second token is a node and a label of the node and the third token is an edge and a label of the edge. In other words, the label of the node and the label of the edge are constituted by the tokens that have been prepared by the end of Step S023. Hereinafter, a simple term "node" sometimes refers to a label of a node. A simple term "edge" sometimes refers to a label of an edge.

In the case where the composition 20 is scope of claims or a claim, nodes of the graph are constituents, and edges of the graph are relations between the constituents. In the case where the composition 20 is a contract document or the like, nodes of the graph are parties A and B, and edges of the graph are the contents and conditions of the contract.

The graph may be built from the dependency relation between tokens, on the basis of a rule. Furthermore, machine learning for labeling the nodes and edges on the basis of a list of tokens may be performed with the use of CRF. Thus, the nodes and edges can be labeled on the basis of the list of tokens. Furthermore, learning with a Seq2Seq model, in which a list of tokens is input and nodes and directions of edges are output, may be performed using a recurrent neural network (RNN), long short-term memory (LSTM), or the like. Thus, the nodes and directions of edges can be output from the list of tokens.

The processing portion 106 may have a function of reversing the direction of the edge and replacing the label of the edge by an antonym of the label of the edge. For example, the graph is assumed to include a first edge and a second edge with a label that is an antonym of the label of the first edge. In this case, with the use of the function, the direction of the second edge is reversed and the label of the second edge is replaced by an antonym of the label of the second edge (i.e., the label of the first edge). Thus, the graph is rebuilt. By the use of the rebuilt graph, substantially the same structure can be covered. Thus, neither the structure nor the expression of a composition is likely to affect composition retrieval. In other words, retrieval can be performed in accordance with the concept of the composition.

Note that the above processing is preferably performed on an edge that appears less frequently in the composition. That is, in the case where the second edge appears less frequently than or as frequently as the first edge, it is preferable to perform processing for reversing the direction of the second edge and replacing the label of the second edge by an antonym of the label of the second edge (i.e., the label of the first edge). This can reduce the frequency of performing the above processing and shorten the time it takes to retrieve a document.

The sequence of Step S023 and Step S024 may be switched. In the case where the sequence of Step S023 and Step S024 is switched, nodes and edges in the graph are abstracted after the graph is built. Thus, even when the sequence of Step S023 and Step S024 is switched, an abstracted graph can be created from the composition.

Through Step S021 to Step S024, the graph 21 can be created from the composition 20.

Note that the graph 21 may be output after Step S002 is performed. Alternatively, the node and the edge constituting the graph 21 may be output after Step S002 is performed, and there may be a step of setting a weight to the node and/or the edge before Step S004 or Step S005 is performed.

<<Actual Example of Creating Graph from Composition>>

Here, an actual example of creating a graph from a composition is described with reference to FIG. 4A to FIG. 4C, FIG. 5A to FIG. 5C, FIG. 6A to FIG. 6D, and FIG. 7A to FIG. 7C.

Figure 5A:
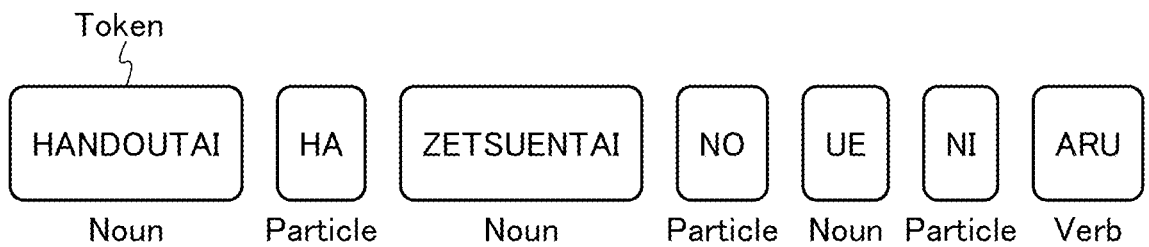
FIG. 5A to FIG. 5C are diagrams showing results obtained in each step.

First, a composition "SANKABUTSUHANDOUTAISOU HA ZETSUENTAISOU NO JOUHOU NI ARU" (see FIG. 4A), which uses the Japanese language, is taken as an example for a description. Note that the rounded rectangles in FIG. 4B, FIG. 4C, and FIG. 5A are tokens, and parts of speech given to the tokens are described below the rounded rectangles.

First, by performing morphological analysis on the composition, the composition is divided into tokens. A part of speech may be given to each of the tokens (Step S021 in FIG. 3). Thus, the result like the one shown in FIG. 4B can be obtained. Specifically, the composition is divided into tokens and a part of speech is given to each of the tokens, as follows: ""SANKA" (noun)|"BUTSU" (noun)|"HANDOUTAI" (noun)|"SOU" (noun)|"HA" (particle) |"ZETSUEN" (noun)|"TAI" (noun)|"SOU" (noun)|"NO" (particle)|"JOUHOU" (noun)|"NI" (particle)|"ARU" (verb)".

Next, syntactic analysis is performed (Step S022 in FIG. 3). Specifically, "SANKA" and "BUTSU", "BUTSU" and "HANDOUTAI", and HANDOUTAI" and "SOU" satisfy the condition described in Step S022. Thus, the four tokens ("SANKA", "BUTSU", "HANDOUTAI", and "SOU") are combined and can be replaced by one token ("SANKABUTSUHANDOUTAISOU"). In addition, "ZETSUEN" and "TAI", and "TAI" and "SOU" satisfy the condition described in Step S022. Thus, the three tokens ("ZETSUEN", "TAI", and "SOU") are combined and can be replaced by one token ("ZETSUENTAISOU"). In this manner, the above composition becomes ""SANKABUTSUHANDOUTAISOU"|(noun)|"HA" (particle) |"ZETSUENTAISOU" (noun)|"NO" (particle)|"JOUHOU" (noun)|"NI" (particle)|"ARU" (verb)" (see FIG. 4C).

Next, the tokens are abstracted (Step S023 in FIG. 3). Specifically, "SANKABUTSUHANDOUTAISOU" is replaced by a hypernym "HANDOUTAI". In addition, "ZETSUENTAISOU" is replaced by a hypernym "ZETSUENTAI". In addition, "JOUHOU" is replaced by a representative word "UE". As a result, the above composition is abstracted to become ""HANDOUTAI" (noun)|"HA" (particle)|"ZETSUENTAI" (noun)|"NO" (particle)|"UE" (noun)|"NI" (particle)|"ARU" (verb)" (see FIG. 5A).

Next, a graph is built (Step S024 in FIG. 3). Specifically, "HANDOUTAI" and "ZETSUENTAI" each become a node of the graph and a label of the node, and "UE" becomes an edge of the graph and a label of the edge. As a result, the graph shown in FIG. 5B is obtained from the above composition.

Here, an antonym of "UE" is "SHITA". Thus, the direction of the edge (the direction of the arrow) in the graph shown in FIG. 5B may be reversed and "UE" as the edge and the label of the edge in the graph shown in FIG. 5B may be replaced by "SHITA", to rebuild the graph shown in FIG. 5C. In this manner, substantially the same structure can be covered.

Figure 5B:
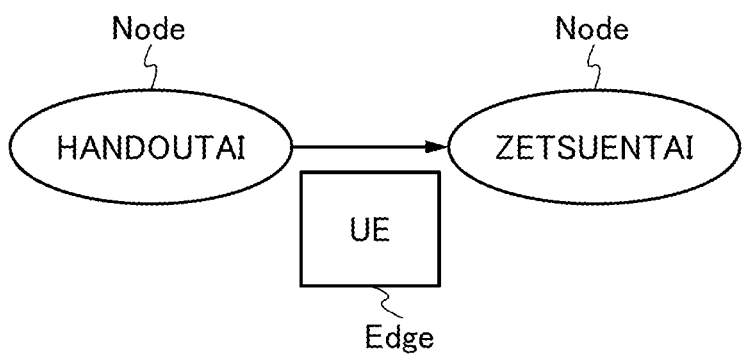
Figure 5C:
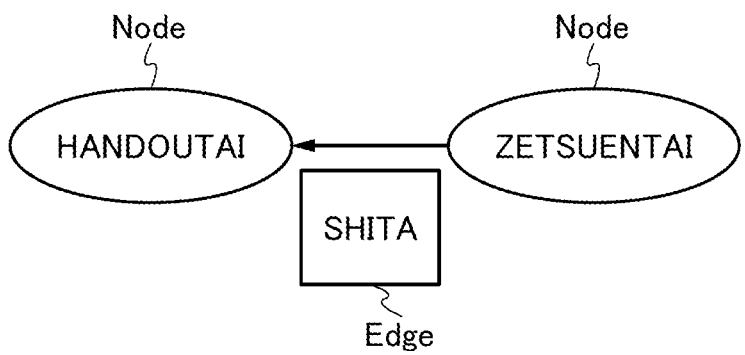

The direction of the edge (the direction of the arrow) shown in FIG. 5B is illustrated from the node that appears earlier in the composition (for the above composition, "HANDOUTAI") toward the node that appears later (for the above composition, "ZETSUENTAI"). In other words, the starting point of the edge (the starting point of the arrow) is the node that appears earlier, and the ending point of the edge (the ending point of the arrow) is the node that appears later. Note that this embodiment is not limited thereto. For example, the direction of an edge (the direction of an arrow) may be determined on the basis of the semantic relation between words, such as the positional relation. Specifically, a graph may be created in which the starting point of an edge (the starting point of an arrow) is the node labeled as "ZETSUENTAI", the ending point of the edge (the ending point of the arrow) is the node labeled as "HANDOUTAI", and an edge between these nodes and the label of the edge are "UE". This enables the graph to be understood intuitively. However, a method for determining the direction of an edge (the direction of an arrow) needs to be standardized in the method for retrieving a document.

In the above manner, an abstracted graph can be created from the above composition.

Figure 7A:
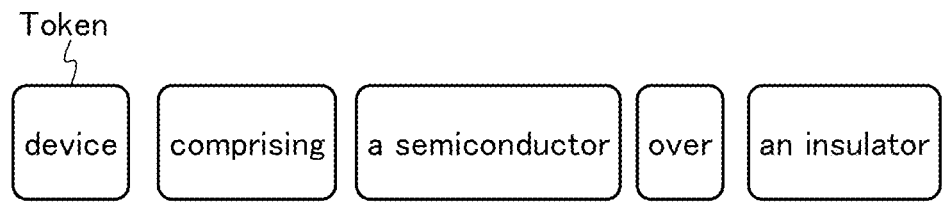
FIG. 7A to FIG. 7C are diagrams showing results obtained in each step.

Next, a composition "A semiconductor device comprising: an oxide semiconductor layer over an insulator layer." (see FIG. 6A), which uses the English language, is taken as an example for a description. Note that the rounded rectangles in FIG. 6C, FIG. 6D, and FIG. 7A are tokens. Although an example in which parts of speech are not given to the tokens is described here, parts of speech may be given to the tokens.

First, the above composition is subjected to cleaning processing. Here, a semicolon is deleted. As a result, the result like the one shown in FIG. 6B can be obtained.

Next, by performing morphological analysis on the composition, the composition is divided into tokens (Step S021 in FIG. 3). As a result, the composition becomes "A|semiconductor|device|comprising|an|oxide|semiconductor|layer|over|an|insulator|layer" (see FIG. 6C).

Next, syntactic analysis is performed (Step S022 in FIG. 3). Specifically, three tokens ("A", "semiconductor", and "device") are combined and can be replaced by one token ("A semiconductor device"). In addition, four tokens ("an", "oxide", "semiconductor", and "layer") are combined and can be replaced by one token ("an oxide semiconductor layer"). In addition, three tokens ("an", "insulator", and "layer") are combined and can be replaced by one token ("an insulator layer"). In this manner, the above composition becomes "A semiconductor device|comprising|an oxide semiconductor layer|over|an insulator layer" (see FIG. 6D).

Next, the tokens are abstracted (Step S023 in FIG. 3). Specifically, "A semiconductor device" is replaced by a hypernym "device". In addition, "an oxide semiconductor layer" is replaced by a hypernym "a semiconductor". In addition, "an insulator layer" is replaced by a hypernym "an insulator". As a result, the above composition is abstracted to become "device|comprising|a semiconductor|over|an insulator" (see FIG. 7A).

Next, a graph is built (Step S024 in FIG. 3). Specifically, "device", "semiconductor", and "insulator" each become a node of the graph and a label of the node, and "comprising" and "over" each become an edge of the graph and a label of the edge. As a result, the graph shown in FIG. 7B is obtained from the above composition.

Here, an antonym of "over" is "under". Thus, the direction of the edge (the arrow) in the graph shown in FIG. 7B may be reversed and "over" as the edge and the label of the edge in the graph shown in FIG. 7B may be replaced by "under", to rebuild the graph shown in FIG. 7C. In this manner, substantially the same structure can be covered.

Figure 7B:
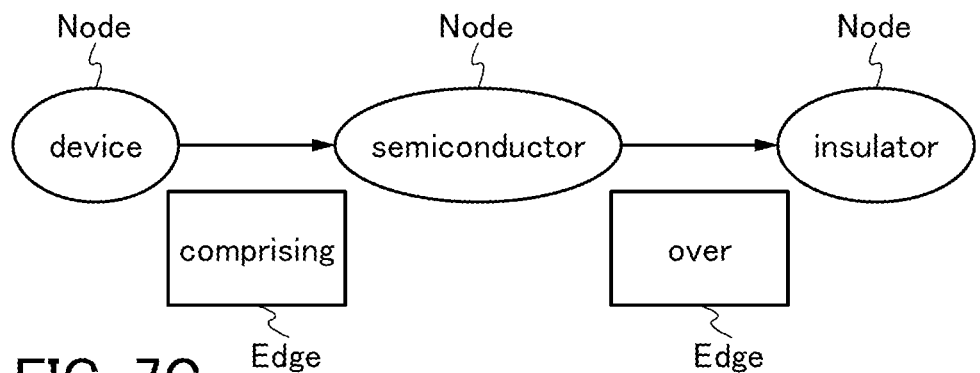
Figure 7C:
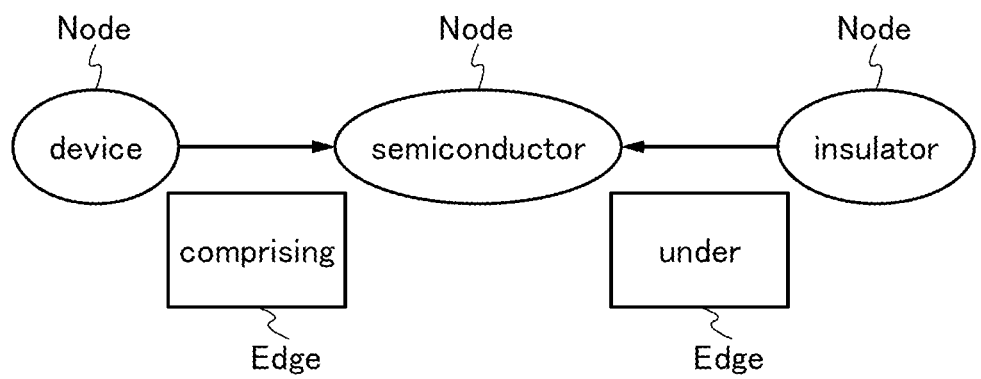

The direction of the edge (the direction of the arrow) shown in FIG. 7B is illustrated from the node that appears earlier in the composition (for the above composition, "semiconductor") toward the node that appears later (for the above composition, "insulator"). In other words, the starting point of the edge (the starting point of the arrow) is the node that appears earlier, and the ending point of the edge (the ending point of the arrow) is the node that appears later. Note that this embodiment is not limited thereto. For example, the direction of an edge (the direction of an arrow) may be determined on the basis of the semantic relation between words, such as the positional relation. Specifically, a graph may be created in which the starting point of an edge (the starting point of an arrow) is the node labeled as "insulator", the ending point of the edge (the ending point of the arrow) is the node labeled as "semiconductor", and an edge between these nodes and the label of the edge are "over". This enables the graph to be understood intuitively. However, a method for determining the direction of an edge (the direction of an arrow) needs to be standardized in the method for retrieving a document.

In the above manner, an abstracted graph can be created from the above composition.

Although the steps up to the creation of a graph from a composition have been described above taking an example of a composition where the Japanese language is used and an example of a composition where the English language is used, the languages of compositions are not limited to the Japanese language and the English language. From compositions where languages such as Chinese, Korean, German, French, Russian, and Hindi are used, graphs can be created by taking steps similar to the above.

[Step S003]

Step S003 is a step of obtaining one or more reference documents. The one or more reference documents are documents that are retrieval objects, and are stored in the memory portion 107.

In the case where the reference document is scope of claims or a claim, a composition included in the reference document may be subjected to the above-mentioned cleaning processing before the process proceeds to Step S004. Performing the cleaning processing can improve the precision of morphological analysis. Note that the cleaning processing is preferably performed as necessary even in the case where the reference document is neither scope of claims nor a claim.

Figure 8:
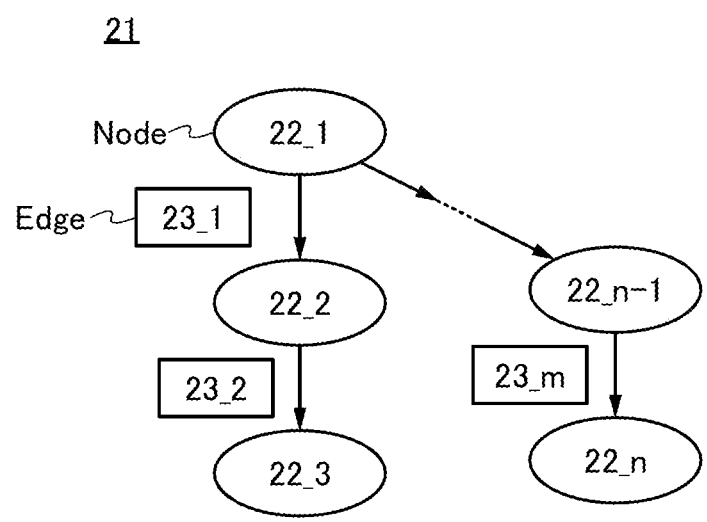
FIG. 8 is a diagram illustrating an example of a graph.

Here, an example of the graph 21 is shown in FIG. 8 to simplify the following description.

The graph 21 shown in FIG. 8 is a directed graph. The graph 21 is constituted by a node group (a node 22_1 to a node 22_$n$ ($n$ is an integer of greater than or equal to 2)) and an edge group (an edge 23_1 to an edge 23_$m$ ($m$ is an integer of greater than or equal to 1 and less than $n$)). Note that each of the node 22_1 to the node 22_$n$ preferably has a sum of an in-degree and an out-degree of greater than or equal to 1.

The starting point of the edge 23_1 is the node 22_1, and the ending point of the edge 23_1 is the node 22_2. The starting point of the edge 23_2 is the node 22_2, and the ending point of the edge 23_2 is the node 22_3. The starting point of the edge 23_$m$ is the node 22_$n$−1, and the ending point of the edge 23_$m$ is the node 22_$n$. Each of the edge 23_3 to the edge 23_$m$−1 is an edge for one in the above node group and another in the above node group.

FIG. 8 shows that a path passing through one or more nodes exists between the node 22_1 and the node 22_$n$−1. In other words, FIG. 8 does not show the one or more nodes and related edges that exist between the node 22_1 and the node 22_$n$−1.

The graph 21 may be represented using a set. For example, the graph 21 (G) is assumed to be constituted by a node set V and an edge set E. In this case, the node set V and the edge set E are expressed as follows (see Formula 1).

$$G=(E,V)$$

$$V=\{22\_1, 22\_2, 22\_3, \ldots, 22\_n{-}1, 22\_n\}$$

$$E=\{23\_1, 23\_2, \ldots, 23\_m\} \quad \text{[Formula 1]}$$

The number of elements of the node set V is $n$, and the number of elements of the edge set E is $m$.

Although the graph 21 (G) is represented using sets (the node set V and the edge set E) in the above description, one embodiment of the present invention is not limited to this. The graph 21 may be represented using a matrix. Examples of the matrix include an adjacency matrix, an incidence matrix, and a degree matrix. Note that the adjacency matrix of the graph 21 is represented with an $n \times n$ matrix. Furthermore, the incidence matrix of the graph 21 is represented with an $n \times m$ matrix.

In this specification and the like, a graph constituted by any one of the edge 23_1 to the edge 23_$m$, a node that is the starting point of the edge, and a node that is the ending point of the edge is sometimes referred to as a local graph of the graph 21. As many local graphs of the graph 21 as there are edges are created. That is, $m$ local graphs of the graph 21 exist. Hereinafter, the $m$ local graphs of the graph 21 are sometimes referred to as a local graph group of the graph 21. Alternatively, the m local graphs of the graph 21 are sometimes referred to as a local graph 24_1 to a local graph 24_m. A local graph of the graph 21 is sometimes referred to as a retrieval local graph, a query local graph, or the like.

[Step S004]

Step S004 is a step in which the processing portion 106 analyzes the reference document. A flowchart showing an example of a process of analyzing the reference document is described below with reference to FIG. 9. Note that the reference document is assumed to be constituted by a sentence 41_1 to a sentence 41_p (p is an integer of greater than or equal to 1).

Figure 9:
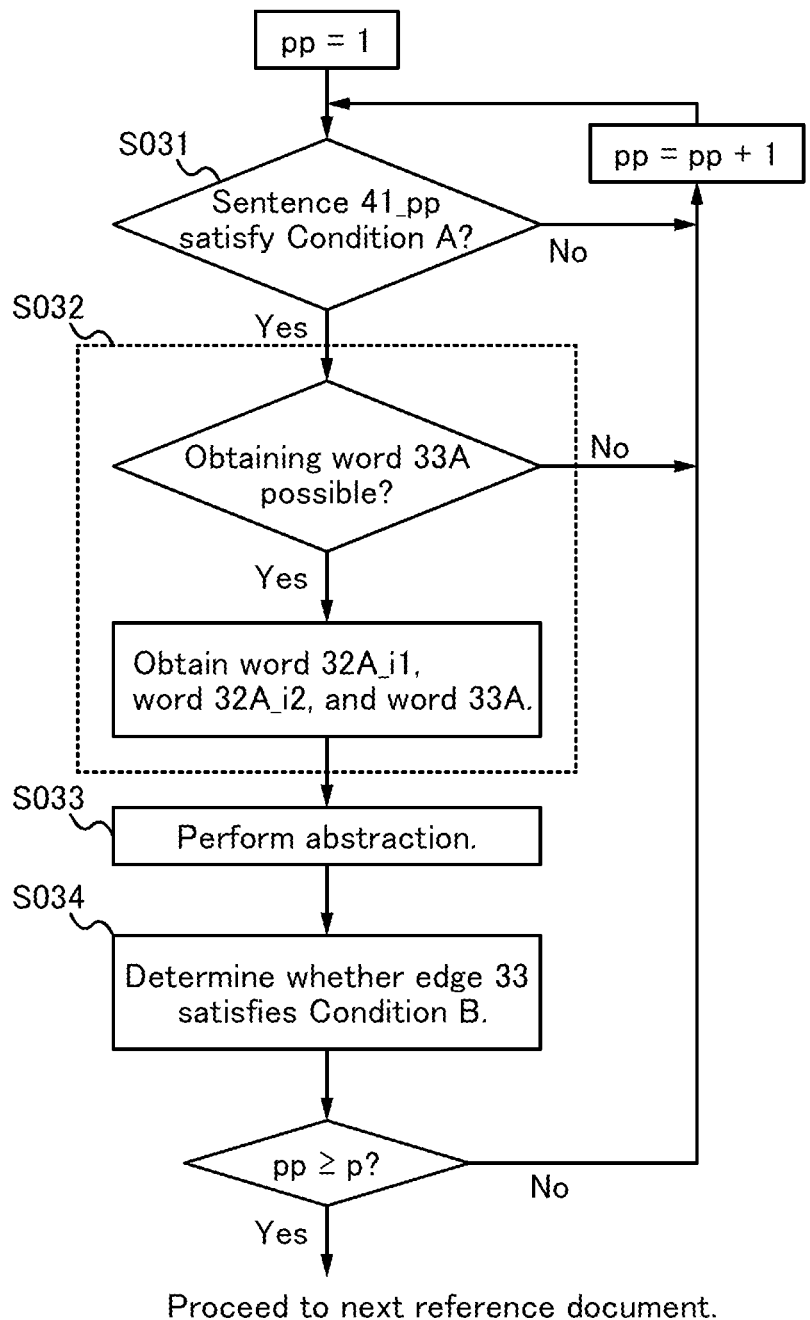
FIG. 9 is a flowchart showing an example of analysis of a reference document.

The process of analyzing the reference document includes Step S031 to Step S034 shown in FIG. 9. Note that the analysis of the reference document preferably starts from the sentence 41_1.

[Step S031]

Step S031 is a step of determining whether the sentence 41_pp (pp is an integer of greater than or equal to 1 and less than or equal to p) satisfies Condition A. Here, Condition A is satisfied when the sentence 41_pp includes two of a word 32A_1 to a word 32A_n. Here, the word 32A_i (i is an integer of greater than or equal to 1 and less than or equal to n) refers to the node 22_i included in the graph 21, a related term of the node 22_i, or a hyponym of the node 22_i. That is, in the case where the word 32A_i is a related term of the node 22_i or a hyponym of the node 22_i, the word 32A_i that has been abstracted matches the node 22_i.

Examples of a related term include a synonym, an antonym, a representative word, a hypernym, and a hyponym. In this specification, a related term means a synonym, an antonym, a representative word, or the like. A hyponym is a representative word that corresponds to a subordinate concept of a representative word. For a related term and a hyponym, a concept dictionary or the like is preferably referred to.

For example, in a description made with reference to FIG. 4C and FIG. 5A, when "semiconductor" is a hypernym, examples of a hyponym of "semiconductor" include "oxide semiconductor" and "silicon semiconductor". Furthermore, examples of a related term of "oxide semiconductor" include "oxide semiconductor layer", "oxide semiconductor film", "crystalline oxide semiconductor", and "polycrystalline oxide semiconductor". Examples of "silicon semiconductor" include "silicon semiconductor layer", "silicon semiconductor film", "single crystal silicon", and "hydrogenated amorphous silicon (sometimes referred to as a-Si:H)". Examples of a hyponym of "oxide semiconductor" include "oxide containing indium, gallium, and zinc (sometimes referred to as IGZO or the like)" and "oxide containing indium and zinc (sometimes referred to as IZO or the like)".

In the case where the sentence 41_pp includes one of the word 32A_1 to the word 32A_n or the case where the sentence 41_pp includes none of the word 32A_1 to the word 32A_n, the sentence 41_pp is determined not to satisfy Condition A. In this case, the process proceeds to analysis of the next sentence (the sentence 41_pp+1).

When the sentence 41_pp includes the word 32A_i1 (i1 is an integer of greater than or equal to 1 and less than or equal to n) and the word 32A_i2 (i2 is an integer of greater than or equal to 1 and less than or equal to n other than i1), the sentence 41_pp is determined to satisfy Condition A. In this case, the word 32A_i1 and the word 32A_i2 can be obtained from the sentence 41_pp. In the case where the sentence 41_pp is determined to satisfy Condition A, the process proceeds to Step S032.

[Step S032]

Step S032 is a step of determining whether a word to be an edge for the word 32A_i1 and the word 32A_i2 can be obtained from the sentence 41_pp. Hereinafter, the word to be the edge for the word 32A_i1 and the word 32A_i2 is referred to as a word 33A. In the case where the word 33A can be obtained, the word 32A_i1, the word 32A_i2, and the word 33A are obtained and then, the process proceeds to Step S033. It is preferable that the word 32A_i1, the word 32A_i2, and the word 33A be obtained by performing Step S021 and Step S022. Performing Step S021 and Step S022 on the sentence 41_pp enables preparing tokens from the sentence 41_pp and knowing the relation between the tokens. In the case where the word 33A cannot be obtained from the sentence 41_pp, the process proceeds to analysis of the next sentence (the sentence 41_pp+1).

[Step S033]

Step S033 is a step of abstracting the word 32A_i1, the word 32A_i2, and the word 33A. Note that the step of abstracting the word 32A_i1, the word 32A_i2, and the word 33A is similar to Step S023. Thus, the description of Step S023 can be referred to for the step of abstracting the word 32A_i1, the word 32A_i2, and the word 33A. Here, the word 32A_i1 that has been abstracted, the word 32A_i2 that has been abstracted, and the word 33A that has been abstracted are respectively referred to as a node 32_i1, a node 32_i2, and an edge 33. The node 32_i1 and the node 32_i2 respectively match the node 22_i1 and the node 22_i2. After the abstraction of the word 32A_i1, the word 32A_i2, and the word 33A, the process proceeds to Step S034.

[Step S034]

Step S034 is a step of determining whether the edge 33 satisfies Condition B. Here, Condition B is satisfied when the edge 33 matches an edge for the node 22_i1 and the node 22_i2 included in the graph 21. In other words, Condition B is satisfied when the graph constituted by the node 32_i1, the node 32_i2, and the edge 33 that have been extracted from the sentence 41_pp is a local graph or an induced subgraph of the graph 21.

The sentence 41_pp may be provided with a flag. The flag for the sentence 41_pp is preferably set in the case where Condition B is determined to be satisfied, for example. By contrast, the flag for the sentence 41_pp is preferably reset in the case where Condition B is determined not to be satisfied.

Thus, the determination of whether Condition B is satisfied ends. After the determination is performed, the process proceeds to analysis of the next sentence (the sentence 41_pp+1).

The process from the step of determining whether Condition A is satisfied to the step of determining whether Condition B is satisfied is performed on all of the sentence 41_1 to the sentence 41_p. After the end of the analysis of the sentence 41_p, the process proceeds to analysis of the next reference document.

The process of analyzing the reference document is not limited to that of the flowchart shown in FIG. 9. For example, the process may be that of the flowchart shown in FIG. 10. In the flowchart shown in FIG. 10, a sentence from which the local graph 24_1 to the local graph 24_m can be created is searched for from the reference document.

The local graph 24_mm (mm is an integer of greater than or equal to 1 and less than or equal to m) is constituted by two nodes and an edge between the two nodes. Here, one of the two nodes, a related term of the one of the two nodes, and a hyponym of the one of the two nodes are collectively referred to as a word group 22A_m1 (m1 is an integer of greater than or equal to 1 and less than or equal to n). Furthermore, the other of the two nodes, a related term of the other of the two nodes, and a hyponym of the other of the two nodes are collectively referred to as a word group 22A_m2 (m2 is an integer of greater than or equal to 1 and less than or equal to n other than m1). The edge, a related term of the edge, and a hyponym of the edge are collectively referred to as a word group 23A_mm. That is, a sentence from which the local graph 24_mm can be created includes at least any one in the word group 22A_m1, any one in the word group 22A_m2, and any one in the word group 23A_mm.

Figure 10:
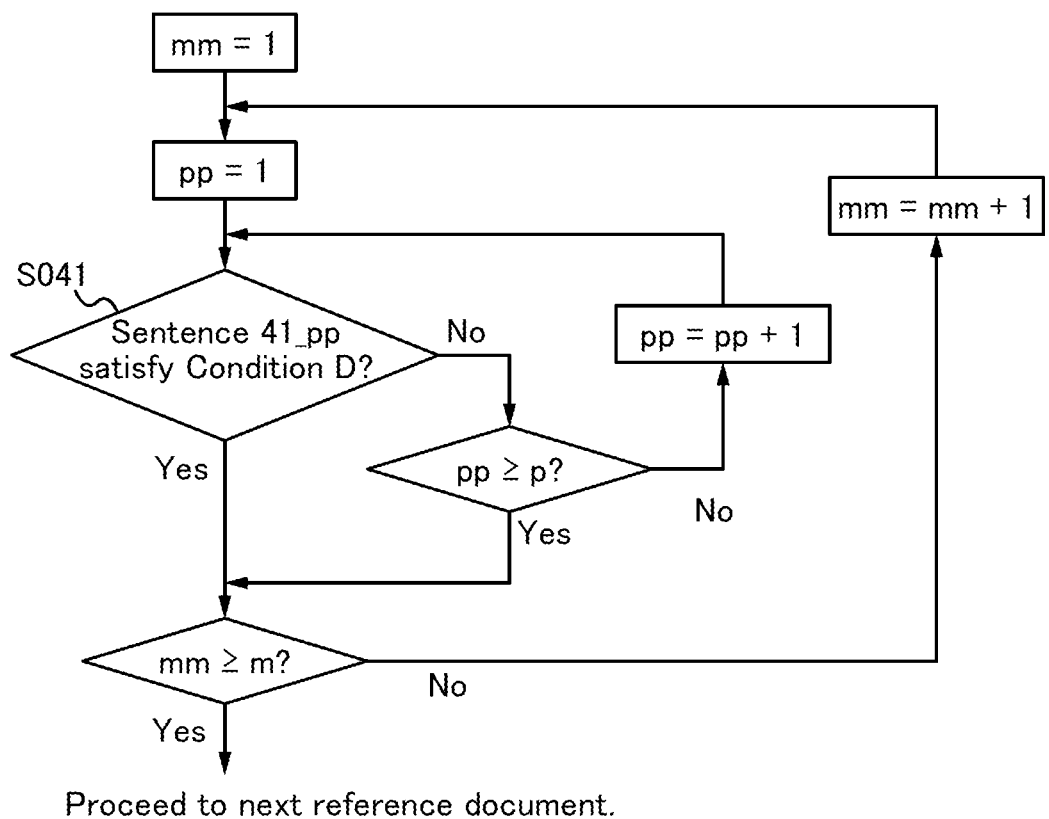
FIG. 10 is a flowchart showing an example of analysis of a reference document.

The process of analyzing the reference document that is shown in FIG. 10 includes Step S041. Note that the analysis of the reference document preferably starts from the local graph 24_1.

[Step S041]

Step S041 is a step of determining whether the sentence 41_pp satisfies Condition D. Here, Condition D is satisfied when the sentence 41_pp includes any one in the word group 22A_m1, any one in the word group 22A_m2, and any one in the word group 23A_mm.

In the case where the sentence 41_pp is determined to satisfy Condition D, the step for making a determination is then performed on the next local graph (the local graph 24_mm+1).

By contrast, in the case where the sentence 41_pp is determined not to satisfy Condition D, a similar determination is made for the sentence 41_pp+1. In the case where none of the sentence 41_1 to the sentence 41_p is determined to satisfy Condition D, the step for making a determination is then performed on the next local graph (the local graph 24_mm+1).

The sentence 41_pp may be provided with a flag. The flag for the sentence 41_pp is preferably set in the case where Condition D is determined to be satisfied, for example. By contrast, the flag for the sentence 41_pp is preferably reset in the case where Condition D is determined not to be satisfied.

The step for making a determination is performed on all of the local graph 24_1 to the local graph 24_m. After the end of the determination for the local graph 24_m, the process proceeds to analysis of the next reference document.

The above is the description of the flowchart showing the example of analysis of the reference document that is different from the flowchart shown in FIG. 9.

A node set Vr and an edge set Er may be created from the above reference document. For example, it is preferable that an edge satisfying Condition B and a node connected to the edge be respectively added to the edge set Er and the node set Vr. Note that the edge is not necessarily added in the case where the edge is already included in the edge set Er. Furthermore, the node is not necessarily added in the case where the node is already included in the node set Vr. In this manner, the edge set Er becomes a sum set of the edges satisfying Condition B. Furthermore, the node set Vr becomes a sum set of the nodes connected to the edges satisfying Condition B.

An example of the above is described. It is assumed that two sentences that satisfy Condition B are found in the reference document. It is assumed that a node matching the node 22_1, a node matching the node 22_2, and an edge matching the edge 23_1 are extracted from one of the two sentences. It is assumed that a node matching the node 22_n−1, a node matching the node 22_n, and an edge matching the edge 23_m are extracted from the other of the two sentences. In this case, the node set Vr is constituted by the node 22_1, the node 22_2, the node 22_n−1, and the node 22_n. Furthermore, the edge set Er is constituted by the edge 23_1 and the edge 23_m.

In the above manner, the reference document can be analyzed. After the end of the above-described analysis of all the reference documents, the process proceeds to Step S005.

[Step S005]

Step S005 is a step in which the processing portion 106 evaluates the reference document. Specifically, Step S005 is a step in which a mark is assigned to the score of the reference document in accordance with a similarity between the composition 20 and the reference document and the score of the reference document is calculated.

A description is made below of examples of a standard for assigning a mark to the score of the reference document and a mark assigned to the score of the reference document by the standard.

<<Standard 1 for Assigning Mark>>

A higher mark is assigned to the score of the reference document when the nodes and edges that can be extracted from the reference document include more nodes and edges that constitute the graph 21. Here, the mark assigned to the score of the reference document by Standard 1 is referred to as a mark 61.

For example, the mark 61 is preferably calculated from the number of subgraphs that can be created from the reference document and that are included in the local graph group (the local graph 24_1 to the local graph 24_m) of the graph 21. Specifically, the mark 61 may be calculated from the ratio (referred to as an inclusion ratio) of the number s of sentences included in the reference document among m sentences from which the local graph 24_1 to the local graph 24_m can be created to the number m of local graph groups of the graph 21. Here, the inclusion ratio is (s/m).

Note that s may be the number of sentences satisfying Condition B described above among the sentence 41_1 to the sentence 41_p included in the reference document, or may be the number of sentences satisfying Condition D described above among the sentence 41_1 to the sentence 41_p included in the reference document.

Here, the inclusion ratio is 1 in the case where the reference document includes all of the m sentences from which the local graph 24_1 to the local graph 24_m can be created. The inclusion ratio is 0 in the case where the reference document includes none of the m sentences from which the local graph 24_1 to the local graph 24_m can be created. It is thus preferable that the product of the inclusion ratio and a weight X1 be assigned as the mark 61 to the score of the reference document.

For another example, the mark 61 may be calculated from a matching ratio of the edge that can be extracted from the reference document with respect to the edge included in the graph 21. Specifically, the mark 61 may be calculated from the ratio (referred to as a matching ratio) of the number of portions common to the edge set Er and the edge set E of the graph 21 to the number of elements of the edge set E. Here, the matching ratio is (t/m).

Here, t is the number of portions common to the edge set Er created in Step S004 and the edge set E of the graph 21. Furthermore, m is the number of elements |E| of the edge set E. At this time, the maximum value of the matching ratio is 1 and the minimum value thereof is 0. It is thus preferable that the product of the matching ratio and a weight X2 be assigned as the mark 61 to the score of the reference document.

The weight X1 or the weight X2 may be specified preliminarily and may be specified by the user. The user may specify the weight X1 or the weight X2 at any timing before Step S005 is performed. For example, the weight X1 or the weight X2 may be specified at the timing of input of the composition 20 or after Step S002 is performed.

Although the example is described in which the above inclusion ratio or the above matching ratio is used to calculate the mark 61, one embodiment of the present invention is not limited to this example. For example, the mark 61 may be calculated from the Frobenius product (also referred to as the Frobenius inner product) of the adjacency matrix of the graph 21 and the adjacency matrix created from the node set Vr, or may be calculated from the inner product of the incidence matrix of the graph 21 and the incidence matrix created from the node set Vr and the edge set Er.

<<Standard 2 for Assigning Mark>>

A higher mark is assigned to the score of the reference document when the distance between sentences in which the node and edge of the graph 21 appear is shorter in the reference document. For example, the mark is preferably calculated from the distance between a sentence in which the node and edge of the graph 21 appear and another sentence in which the node and edge of the graph 21 appear. Note that the distance is preferably calculated using the flag set in Step S004. Here, the mark assigned to the score of the reference document by Standard 2 is referred to as a mark 62.

A sentence in which the node and edge of the graph 21 appear is the sentence 41_p1 (p1 is an integer of greater than or equal to 1 and less than or equal to p), and another sentence in which the node and edge of the graph 21 appear is the sentence 41_p2 (p2 is an integer of greater than or equal to 1 and less than or equal to p other than p1). Specifically, a distance r between the sentence 41_p1 and the sentence 41_p2 is (|p1−p2|−1). That is, r is 0 when the sentence 41_p1 is adjacent to the sentence 41_p2. Furthermore, r is (p−2) when the distance between the sentence 41_p1 and the sentence 41_p2 is largest.

Thus, a value (p−2−r)/(p−2) is calculated. The value (p−2−r)/(p−2) is 1 when the sentence 41_p1 is adjacent to the sentence 41_p2, and the value (p−2−r)/(p−2) is 0 when the distance between the sentence 41_p1 and the sentence 41_p2 is the largest. It is thus preferable that the product of the value (p−2−r)/(p−2) and a weight Y be added as the mark 62 to the score of the reference document.

The weight Y may be specified preliminarily and may be specified by the user. The user may specify the weight Y at any timing before Step S005 is performed. For example, the weight Y may be specified at the timing of input of the composition 20 or after Step S002 is performed.

Note that a method for calculating the distance between a sentence in which the node and edge appear and another sentence in which the node and edge appear is not limited to the above. For example, in the case where the graph 21 is a directed graph, for a node having a sum of an in-degree and an out-degree of greater than or equal to 2, the distance between a sentence from which an edge between the node and a node adjacent to the node can be extracted and a sentence from which an edge between the node and another node adjacent to the node can be extracted may be calculated.

<<Standard 3 for Assigning Mark>>

A higher mark is assigned to the score of the reference document when the node and edge before the abstraction that are obtained from a composition included in the reference document are closer to the node and edge before the abstraction that are included in the graph 21. For example, it is preferable that the mark to be assigned be determined by evaluating the relation between the node (edge) before the abstraction that is obtained from the composition included in the reference document and the node (edge) before the abstraction that is included in the graph 21. Here, the mark assigned to the score of the reference document by Standard 3 is referred to as a mark 63.

As described above, the abstraction is work for replacing a token by a representative word or a hypernym. That is, a node before the abstraction is a token before being replaced by a hypernym or a representative word and is a token before Step S023 is performed. In other words, a node before the abstraction is a word itself which appears in a composition included in the above reference document.

Here, the case where the word 32A_i3 (i3 is an integer of greater than or equal to 1 and less than or equal to n) is obtained from a composition included in the reference document is described. Note that a node 32_i3 that is obtained by abstraction of the word 32A_i3 matches the node 22_i3 of the graph 21. The node 22_i3 before the abstraction is referred to as a word 22A_i3. The word 22A_i3 is a word that appears in the composition 20.

For example, in the case where the word 32A_i3 and the word 22A_i3 match each other, the reference document and the composition 20 are likely to be similar to each other. Thus, the reference document can be regarded as having a concept close to the concept of the composition 20. At this time, the mark 63 assigned to the score of the reference document is made high.

In the case where the word 32A_i3 and the word 22A_i3 do not match each other, the reference document and the composition 20 are unlikely to be similar to each other. Thus, the reference document can be regarded as having a concept far from the concept of the composition 20. At this time, the mark 63 assigned to the score of the reference document is made low or set to 0. Note that the mark 63 assigned to the score of the reference document is preferably adjusted in accordance with the relation between the word 32A_i3 and the word 22A_i3.

Here, a value representing the relation between the word 32A_i3 and the word 22A_i3 is assumed to be r2. The value r2 is calculated from the position of the word 32A_i3 with respect to the word 22A_i3. Here, an example of a method for calculating the value r2 is described with reference to FIG. 11.

Figure 11:
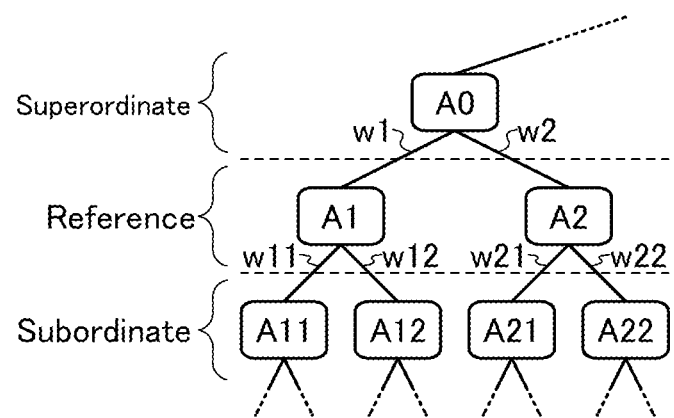
FIG. 11 is a diagram illustrating relations between words.

FIG. 11 is a diagram illustrating relations between words. As shown in FIG. 11, a word A1 and a word A2 are hyponyms of a word A0. The word A1 is a related term of the word A2 and vice versa. A word A11 and a word A12 are hyponyms of the word A1. The word A11 is a related term of the word A12 and vice versa. A word A21 and a word A22 are hyponyms of the word A2. The word A21 is a related term of the word A22 and vice versa.

Here, a word and a hypernym of the word are connected to each other as shown in FIG. 11. Furthermore, a word and a hyponym of the word are connected to each other. At this time, the words shown in FIG. 11 (the word A0, the word A1, the word A2, the word A11, the word A12, the word A21, and the word A22) can be regarded as nodes of a graph. Lines connecting the words can be regarded as edges of the graph.

The distance between the word A0 and the word A1 is w1. The distance between the word A0 and the word A2 is w2. The distance between the word A1 and the word A11 is w11. The distance between the word A1 and the word A12 is w12. The distance between the word A2 and the word A21 is w21. The distance between the word A2 and the word A22 is w22.

The word 22A_i3 is assumed to be the word A1 shown in FIG. 11. The distance of the shortest path from the word 32A_i3 to the word 22A_i3 is W. The shortest path from the word 32A_i3 to the word 22A_i3 refers to a path with a smallest number of edges among paths connecting the word 32A_i3 and the word 22A_i3. That is, the distance of the shortest path is the sum of the distances corresponding to the edges existing on the shortest path.

When the word 32A_i3 matches the word 22A_i3, W is 0. When the word 32A_i3 is a hypernym (the word A0 shown in FIG. 11) of the word 22A_i3, W is w1. When the word 32A_i3 is a hyponym (the word A11 or the word A12 shown in FIG. 11) of the word 22A_i3, W is w11 or w12. When the word 32A_i3 is a related term (the word A2 shown in FIG. 11) of the word 22A_i3, W is w1+w2. When the word 32A_i3 is a hyponym (the word A21 or A22 shown in FIG. 11) of a related term of the word 22A_i3, W is w1+w2+w21 or w1+w2+w22.

The value r2 is preferably calculated as $1/(1+W)$. In this case, the value r2 is 1 when the word 32A_i3 and the word 22A_i3 match each other, and the value r2 is the minimum value when the distance of the shortest path from the word 32A_i3 to the word 22A_i3 is largest.

Alternatively, the value r2 may be calculated as $(Wmax-W)/Wmax$. Here, Wmax is the largest value of the distance of the shortest path from the word 32A_i3 to the word 22A_i3. In this case, the value r2 is 1 when the word 32A_i3 and the word 22A_i3 match each other, and the value r2 is 0 when the distance of the shortest path from the word 32A_i3 to the word 22A_i3 is largest.

It is preferable that the product of the value r2 calculated by the above method and a weight Z1 be assigned as the mark 63 to the score of the reference document.

Interword distances (the distance w1, the distance w2, the distance w11, the distance w12, the distance w21, and the distance w22) may be specified preliminarily and may be specified by the user. The user may specify the interword distances at any timing before Step S005 is performed. For example, the interword distances may be specified at the timing of input of the composition 20 or after Step S002 is performed.

Also for the edge, a method similar to the above method is preferably employed to determine the mark 63 to be assigned to the score of the reference document. For example, the mark 63 is preferably the product of the value r2 and a weight Z2.

Note that the edge has a direction when the graph 21 is a directed graph. Accordingly, in the case where the direction of the edge obtained from a sentence included in the reference document is the same as the direction of the edge of the graph 21, the edge can be regarded as having a concept close to the concept of the graph 21 before the abstraction. At this time, the mark 63 assigned to the score of the reference document is preferably made high. By contrast, in the case where the direction of the edge extracted from a sentence included in the reference document is opposite to the direction of the edge of the graph 21, the edge can be regarded as having a concept far from the concept of the graph 21 before the abstraction. At this time, the mark 63 assigned to the score of the reference document is preferably made low or set to 0.

The weight Z1 and the weight Z2 may be specified preliminarily and may be specified by the user. The user may specify the weight Z1 and the weight Z2 at any timing before Step S005 is performed. For example, the weight Z1 and the weight Z2 may be specified at the timing of input of the composition 20 or after Step S002 is performed.

<<Standard 4 for Assigning Mark>>

When the node and edge are superordinate concepts or subordinate concepts of the graph 21, a mark is assigned to the score of the reference document in accordance with retrieval conditions. For example, the values of the interword distances (the distance w1, the distance w2, the distance w11, the distance w12, the distance w21, and the distance w22) shown in FIG. 11 are preferably adjusted. Here, the mark assigned to the score of the reference document by Standard 4 is referred to as a mark 64.

In the case where a document that is a superordinate concept of the graph 21 is desired to be retrieved, the distance w11 and the distance w12 are set to infinity or values significantly larger than the value of another interword distance (e.g., the distance w1). In this manner, the mark 64 assigned to the score of a reference document that is a subordinate concept of the graph 21 can be a value close to 0. It is thus possible to improve the retrievability of the reference document that is a superordinate concept of the graph 21. Note that the distance w2 or the distance w21 and the distance w22 may be set to infinity or a value significantly larger than the value of another interword distance (e.g., the distance w1). In this case, it is possible to further improve the retrievability of the reference document that is a superordinate concept of the graph 21.

In the case where a document that is a subordinate concept of the graph 21 is desired to be retrieved, the distance w1 is set to infinity or a value significantly larger than the value of another interword distance (e.g., the distance w11). In this manner, the mark 64 assigned to the score of a reference document that is a superordinate concept of the graph 21 can be a value close to 0. It is thus possible to improve the retrievability of the reference document that is a subordinate concept of the graph 21.

In the above manner, a document can be efficiently retrieved in accordance with the retrieval conditions.

The above is the examples of a standard for assigning a mark to the score of the reference document and a mark assigned to the score of the reference document by the standard. For the mark assigned to the score of the reference document, one or an appropriate combination of Standard 1 to Standard 4 described above is preferably used. The standard for the mark to be assigned to the score of the reference document is not limited to the above, and the score of the reference document is preferably calculated with appropriate conditions set.

<<Example of Calculating Score of Reference Document>>

Figures 12A, 12B:
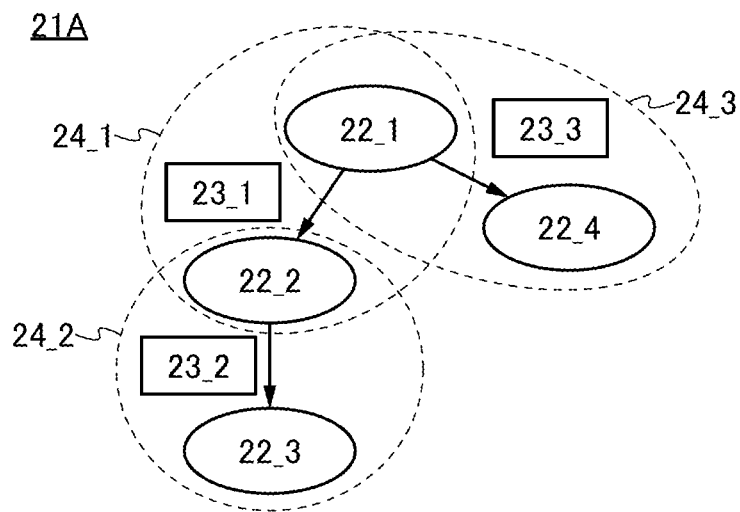
FIG. 12A is a diagram illustrating an example of a graph.
FIG. 12B is a diagram showing results obtained in each step.

Here, an example of calculating the score of a reference document is described with reference to FIG. 12A, FIG. 12B, FIG. 13A, and FIG. 13B. To simplify the description, a graph 21A having the structure shown in FIG. 12A is used in this section. The number of reference documents that are retrieval objects is 4 (a reference document 40a, a reference document 40b, a reference document 40c, and a reference document 40d).

Each of the reference document 40a to the reference document 40d is assumed to be constituted by 10 sentences. That is, p of each of the reference document 40a to the reference document 40d is assumed to be 10. In this case, the reference document 40a is constituted by a sentence 41a_1 to a sentence 41a_10, the reference document 40b is constituted by a sentence 41b_1 to a sentence 41b_10, the reference document 40c is constituted by a sentence 41c_1 to a sentence 41c_10, and the reference document 40d is constituted by a sentence 41d_1 to a sentence 41d_10.

The graph 21A shown in FIG. 12A is a different example of the graph 21. The graph 21A is constituted by the node 22_1 to the node 22_4 and the edge 23_1 to the edge 23_3. The starting point of the edge 23_1 is the node 22_1, and the ending point of the edge 23_1 is the node 22_2. The starting point of the edge 23_2 is the node 22_2, and the ending point of the edge 23_2 is the node 22_3. The starting point of the edge 23_3 is the node 22_1, and the ending point of the edge 23_3 is the node 22_4.

The local graph 24_1, the local graph 24_2, and the local graph 24_3 shown in FIG. 12A are local graphs of the graph 21A as well as subgraphs of the graph 21A. The local graph 24_1 is constituted by the node 22_1, the node 22_2, and the edge 23_1. The local graph 24_2 is constituted by the node 22_2, the node 22_3, and the edge 23_2. The local graph 24_3 is constituted by the node 22_1, the node 22_4, and the edge 23_3.

A sentence from which the local graph 24_1 can be created is a sentence 30_1. That is, the local graph 24_1 can be created from words extracted from the sentence 30_1. A sentence from which the local graph 24_2 can be created is a sentence 30_2. That is, the local graph 24_2 can be created from words extracted from the sentence 30_2. A sentence from which the local graph 24_3 can be created is a sentence 30_3. That is, the local graph 24_3 can be created from words extracted from the sentence 30_3.

As shown in FIG. 12B, the reference document 40a is assumed to include the sentence 30_1 to the sentence 30_3. Of the sentences included in the reference document 40a, the sentence 41a_5 corresponds to the sentence 30_1, the sentence 41a_6 corresponds to the sentence 30_2, and the sentence 41a_8 corresponds to the sentence 30_3.

As shown in FIG. 12B, the reference document 40b is assumed to include the sentence 30_1 and the sentence 30_2 and not to include the sentence 30_3. Of the sentences included in the reference document 40b, the sentence 41b_5 corresponds to the sentence 30_1 and the sentence 41b_6 corresponds to the sentence 30_2.

As shown in FIG. 12B, the reference document 40c is assumed to include the sentence 30_1 and the sentence 30_2 and not to include the sentence 30_3. Of the sentences included in the reference document 40c, the sentence 41c_2 corresponds to the sentence 30_1 and the sentence 41c_6 corresponds to the sentence 30_2.

As shown in FIG. 12B, the reference document 40d is assumed to include the sentence 30_1 and not to include the sentence 30_2 nor the sentence 30_3. Of the sentences included in the reference document 40d, the sentence 41d_2 corresponds to the sentence 30_1.

It is preferable that the significant figure (the final digit of the significant figure) of each of the values calculated by the respective standards (e.g., the inclusion ratio, the value $(p-2-r)/(p-2)$, and the value r2), the weights (the weight X1, the weight Y1, and the weight Z1), marks to be assigned, and the like be appropriately adjusted in accordance with the number of reference documents to be evaluated. For example, the significant figure is preferably larger or the final digit of the significant figure is preferably smaller when the number of reference documents to be evaluated is larger. Here, the final digit of the significant figure is the second decimal place.

First, an example in which the mark 61 is assigned to the score of each of the reference document 40a to the reference document 40d by Standard 1 described above is described with reference to FIG. 12B. Note that the weight X1 is assumed to be 1.00.

The above inclusion ratio (and the mark 61 to be assigned) for the reference document 40a is 1.00. The above inclusion ratio (and the mark 61 to be assigned) for the reference document 40b and the reference document 40c is 0.67 (=2/3). The above inclusion ratio (and the mark 61 to be assigned) for the reference document 40d is 0.33 (=1/3). Accordingly, for the four reference documents, the highest mark 61 is assigned to the score of the reference document 40a, the second highest mark 61 is assigned to the scores of the reference document 40b and the reference document 40c, and the lowest mark 61 is assigned to the score of the reference document 40d.

Next, an example in which the mark 62 is assigned to the score of each of the reference document 40a to the reference document 40d by Standard 2 described above is described with reference to FIG. 13A. Note that the weight Y is assumed to be 1.00.

In the reference document 40a and the reference document 40b, the distance r between the sentence 30_1 and the sentence 30_2 is 0. Thus, the value $(p-2-r)/(p-2)$ (and the mark 62 to be assigned) is 1.00. In the reference document 40c, the distance r between the sentence 30_1 and the sentence 30_2 is 3. Thus, the value $(p-2-r)/(p-2)$ (and the mark 62 to be assigned) is 0.63 (=5/8). Therefore, the mark 62 to be assigned to the score of the reference document 40b is higher than the mark 62 to be assigned to the score of the reference document 40c. Note that the distance r between the sentence 30_1 and the sentence 30_2 in the reference document 40d cannot be calculated and thus, the value $(p-2-r)/(p-2)$ (and the mark 62 to be assigned) is assumed to be 0.00.

Next, an example in which the mark 63 and the mark 64 (a mark 64A or a mark 64B) are assigned to the score of each of the reference document 40a to the reference document 40d by Standard 3 and Standard 4 described above is described with reference to FIG. 13B. Specifically, a description is made of a method for calculating, from the sentence 30_1 included in each of the reference document 40a to the reference document 40d, the mark 63 and the mark 64 to be assigned to the scores of the reference documents. Note that the weight Z1 is assumed to be 1.00. The value r2 is calculated as $1/(1+W)$.

Here, it is assumed that the word 32A_1 is extracted from the sentence 30_1. The word 32A_1 that has been abstracted is assumed to match the node 22_1. Here, the node 22_1 before the abstraction is a word 22A_1. The word 22A_1 is a word that appears in the composition 20. Note that the word 22A_1 is the word A1 shown in FIG. 11.

As shown in FIG. 13B, the word 32A_1 obtained from the reference document 40a is the word A1 shown in FIG. 11. The word 32A_1 obtained from the reference document 40b is the word A11 shown in FIG. 11. The word 32A_1 obtained from the reference document 40c is the word A0 shown in FIG. 11. The word 32A_1 obtained from the reference document 40d is the word A22 shown in FIG. 11.

In the above case, W for the reference document 40a is 0, W for the reference document 40b is w11, W for the reference document 40c is w1, and W for the reference document 40d is w1+w2+w22.

First, each of the interword distances (the distance w1, the distance w2, the distance w11, the distance w12, the distance w21, and the distance w22) shown in FIG. 11 is set to 1.00. Here, the mark assigned to the reference documents is the mark 63.

At this time, the value r2 in the reference document 40a is 1.00, the value r2 in the reference document 40b is 0.50 (=½), the value r2 in the reference document 40c is 0.50 (=½), and the value r2 in the reference document 40d is 0.25 (=¼).

Accordingly, for the four reference documents, the highest mark 63 is assigned to the score of the reference document 40a, the second highest mark 63 is assigned to the scores of the reference document 40b and the reference document 40c, and the lowest mark 63 is assigned to the score of the reference document 40d.

When each of the interword distances is set to 1, the score of the reference document with a concept close to the concept of the composition 20 can be high.

Then, the distance w1, the distance w21, and the distance w22 are set to 1.00, and the distance w2, the distance w11, and the distance w12 are set to infinity. Here, the mark assigned to the reference documents is the mark 64A.

At this time, the value r2 in the reference document 40a is 1.00, the value r2 in the reference document 40b is substantially 0, the value r2 in the reference document 40c is 0.50 (=½), and the value r2 in the reference document 40d is substantially 0.

Accordingly, for the four reference documents, the highest mark 64A is assigned to the score of the reference document 40a, the second highest mark 64A is assigned to the score of the reference document 40c, and the lowest mark 64A is assigned to the scores of the reference document 40b and the reference document 40d.

When the interword distances are set as described above, the score of the reference document with a concept close to a superordinate concept of the composition 20 can be high.

Then, the distance w2, the distance w11, the distance w12, the distance w21, and the distance w22 are set to 1.00, and the distance w1 is set to infinity. Here, the mark assigned to the reference documents is the mark 64B.

At this time, the value r2 in the reference document 40a is 1.00, the value r2 in the reference document 40b is 0.50 (=½), the value r2 in the reference document 40c is substantially 0, and the value r2 in the reference document 40d is substantially 0.

Accordingly, for the four reference documents, the highest mark 64B is assigned to the score of the reference document 40a, the second highest mark 64B is assigned to the score of the reference document 40b, and the lowest mark 64B is assigned to the scores of the reference document 40c and the reference document 40d.

When the interword distances are set as described above, the score of the reference document with a concept close to a subordinate concept of the composition 20 can be high.

In the above manner, the scores of the reference documents can be calculated.

Although the description has been made on the assumption that each of the weight X1, the weight Y, and the weight Z1 is 1.00, one embodiment of the present invention is not limited thereto. To perform document retrieval with a focus on a word used in the composition 20, for example, the value of the weight Z1 is preferably set larger than the values of the weight X1 and the weight Y. To perform document retrieval with a focus on an edge of the graph 21A, for example, the value(s) of the weight X1 and/or the weight Y is/are preferably set larger than the value of the weight Z1.

The above is the description of Step S005. By performing Step S005, a mark is assigned to the score of the reference document in accordance with a similarity between the composition 20 and the reference document. Accordingly, the higher the score of the reference document is, the higher the similarity between the reference document and the composition 20 is. Thus, a document similar to the composition 20 can be retrieved.

Figure 14:
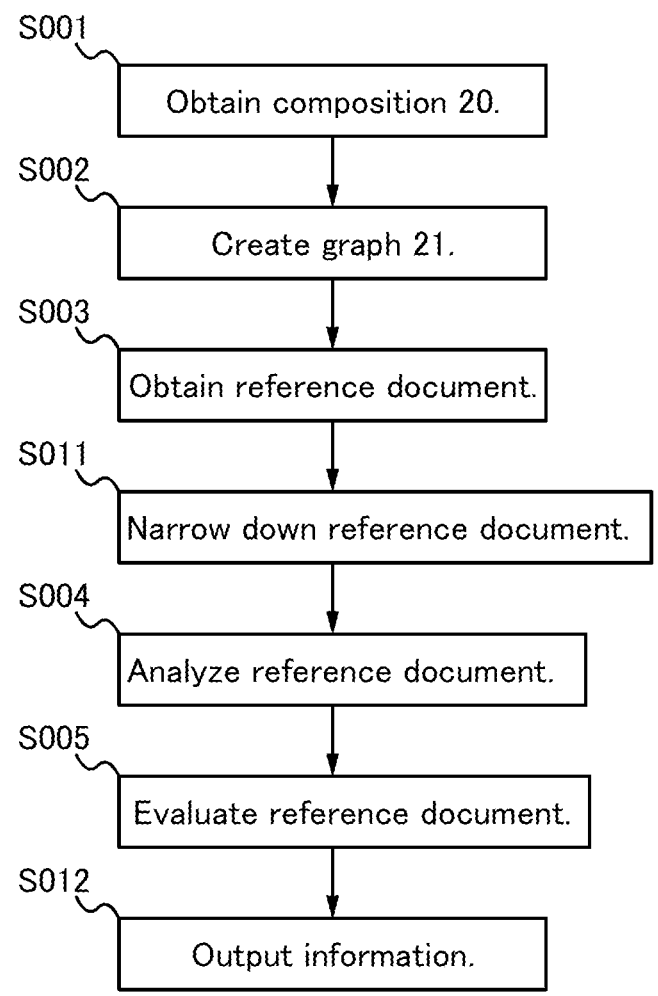
FIG. 14 is a flowchart showing an example of a document retrieval method.
Figure 15:
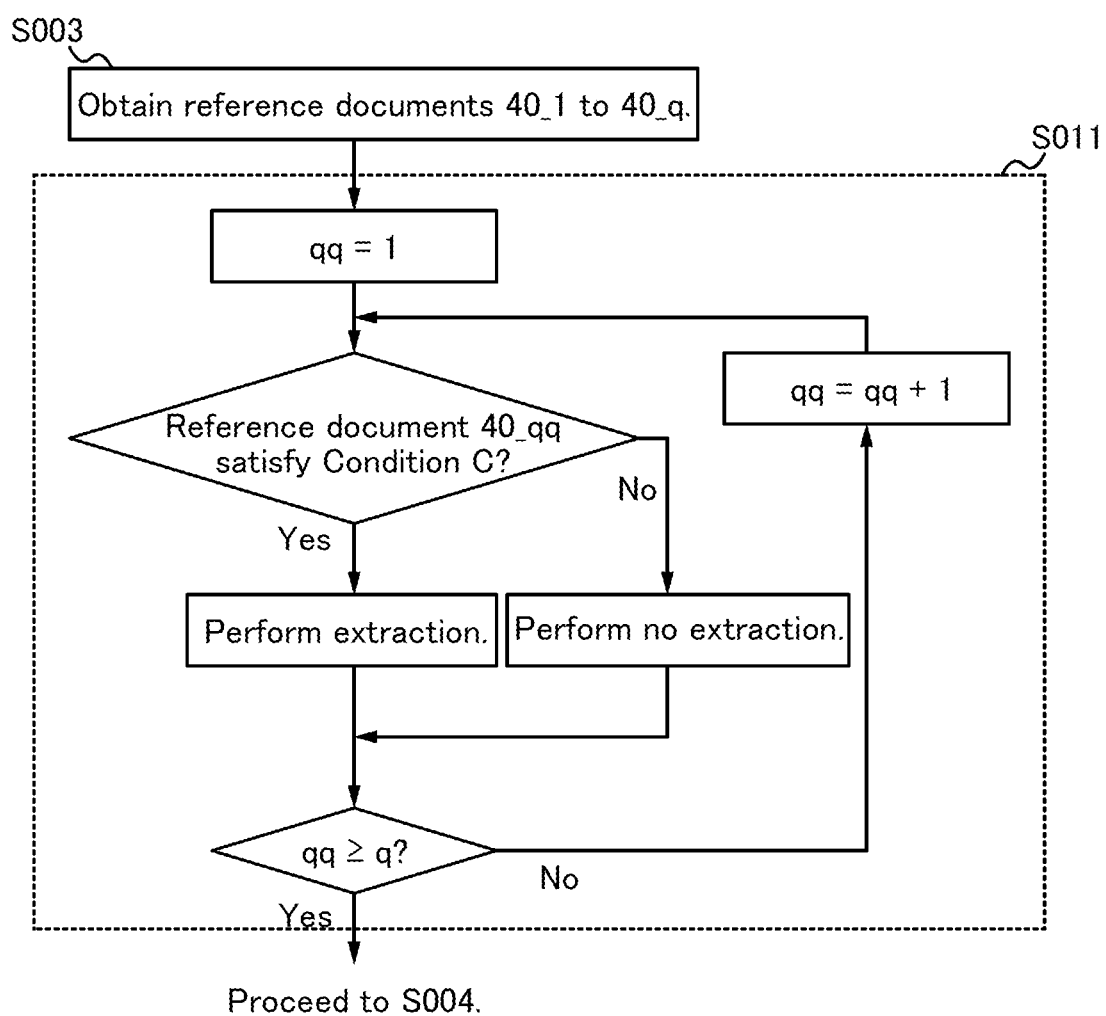
FIG. 15 is a flowchart showing an example of narrowing down reference documents.

By the above method, document retrieval can be performed. Note that a document retrieval method is not limited to the above. For example, a document retrieval method may include Step S011 and Step S012 in addition to Step S001 to Step S005 as shown in FIG. 14.

[Step S011]

Step S011 is a step of narrowing down reference documents and is performed between Step S003 and Step S004. A flowchart where a plurality of reference documents (a reference document 40_1 to a reference document 40_q (q is an integer of greater than or equal to 1)) obtained in Step S003 are narrowed down is described below with reference to FIG. 15.

Step S011 preferably starts from the reference document 40_1.

It is determined whether the reference document 40_qq (qq is an integer of greater than or equal to 1 and less than or equal to q) satisfies Condition C. Here, Condition C is satisfied when the reference document 40_qq includes all of the word 32A_1 to the word 32A_n described in Step S004.

In the case where the reference document 40_qq is determined to satisfy Condition C, the reference document 40_qq is extracted. In the case where the reference document 40_qq is determined not to satisfy Condition C, the reference document 40_qq is not extracted.

Note that Condition C is not limited to the above. For example, Condition C may be satisfied when the reference document 40_qq includes some of the word 32A_1 to the word 32A_n described in Step S004. In this case, retrieval of a similar document can be performed in accordance with some of the word 32A_i to the word 32A_n.

Thus, the determination of whether Condition C is satisfied ends. After the determination is performed, the process proceeds to analysis of the next reference document (the reference document 40_qq+1).

The step of determining whether Condition C is satisfied is performed for each of the reference document 40_1 to the reference document 40_q. After the end of narrowing down for the reference document 40_q, the process proceeds to Step S004.

By performing Step S011, only a reference document similar to the composition 20 can be extracted from the plurality of reference documents. Accordingly, the reference documents to be compared with the composition 20 can be narrowed down, whereby the time it takes to retrieve a document can be shortened.

[Step S012]

Step S012 is a step in which the output portion 104 outputs information. The information relates to the results calculated in the processing portion 106. For example, the information is the score of the reference document. Alternatively, the information is the reference document with the highest score. Further alternatively, the information is ranking data obtained by ranking based on scores.

The information is output as visual information such as a character string, a numerical value, or a graph, audio information, or the like, to the output portion 104. The above information may be output to a memory included in the memory portion 107 or the processing portion 106, for example.

The above is the description of the method for retrieving a document. When the method for retrieving a document of one embodiment of the present invention is employed, with the concept of a composition that is specified for retrieval being taken into account, a document similar to the composition can be retrieved. In addition, the document that is similar to the composition specified for retrieval can be retrieved in the state of being ranked. Furthermore, retrieval based on the concept of the composition can be performed with less effects of the composition structures or expressions. In the case where two compositions in different languages have the same concept, the same graph is created from the two compositions. Accordingly, the use of the document retrieval method of one embodiment of the present invention facilitates retrieval of a document from documents in a different language.

According to one embodiment of the present invention, a method for retrieving a document with the concept of the document taken into account can be provided.

This embodiment can be combined with the other embodiment as appropriate. In this specification, in the case where a plurality of structure examples are shown in one embodiment, the structure examples can be combined as appropriate.

Embodiment 2

In this embodiment, the document retrieval system of one embodiment of the present invention is described with reference to FIG. 16 and FIG. 17.

The document retrieval system of this embodiment can perform document retrieval easily with the use of the method for retrieving a document described in Embodiment 1.

<Structure Example 1 of Document Retrieval System>

Figure 16:
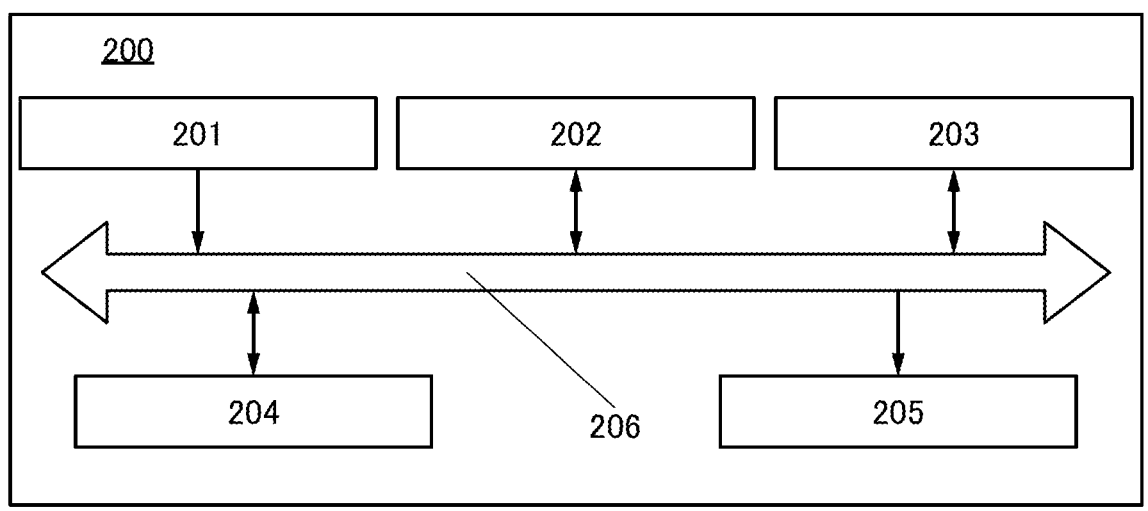
FIG. 16 is a diagram showing an example of hardware of a document retrieval system.

FIG. 16 shows a block diagram of a document retrieval system 200. Note that in the drawings attached to this specification, the block diagram in which components are classified according to their functions and shown as independent blocks is shown; however, it is difficult to completely separate actual components according to their functions, and it is possible for one component to relate to a plurality of functions. Moreover, one function can relate to a plurality of components; for example, processing performed by a processing portion 202 can be executed on different servers depending on the processing.

The document retrieval system 200 includes at least the processing portion 202. The document retrieval system 200 in FIG. 16 further includes an input portion 201, a memory portion 203, a database 204, a display portion 205, and a transmission path 206.

[Input Portion 201]

To the input portion 201, a composition is supplied from the outside of the document retrieval system 200. The composition is a retrieval composition and corresponds to the composition 20 described in Embodiment 1. In addition, a plurality of reference documents may be supplied from the outside of the document retrieval system 200 to the input portion 201. The plurality of reference documents are to be compared with the above composition, and correspond to the plurality of reference documents described in Embodiment 1. The plurality of reference documents and the composition supplied to the input portion 201 are each supplied to the processing portion 202, the memory portion 203, or the database 204 through the transmission path 206.

The plurality of reference documents and the composition are input in the form of text data, audio data, or image data, for example. The composition included in each of the plurality of reference documents is preferably input in the form of text data.

Examples of a method for inputting the composition include key input with a keyboard, a touch panel, or the like, audio input with a microphone, reading from a recording medium, image input with a scanner, a camera, or the like, and obtainment via communication.

The document retrieval system 200 may have a function of converting audio data into text data. For example, the processing portion 202 may have the function. Alternatively, the document retrieval system 200 may further include an audio conversion portion having the function.

The document retrieval system 200 may have an optical character recognition (OCR) function. This enables characters contained in image data to be recognized and text data to be created. For example, the processing portion 202 may have the function. Alternatively, the document retrieval system 200 may further include a character recognition portion having the function.

[Processing Portion 202]

The processing portion 202 has a function of performing processing with the use of the data supplied from the input portion 201, the memory portion 203, the database 204, or the like. The processing portion 202 can supply a processing result to the memory portion 203, the database 204, the display portion 205, or the like.

The processing portion 202 includes the processing portion 106 described in Embodiment 1. That is, the processing portion 202 has a function of performing morphological analysis, a function of performing syntactic analysis, an abstraction function, and a function of creating a graph. The processing portion 202 has a function of analyzing reference documents and a function of evaluating reference documents.

A transistor whose channel formation region contains a metal oxide may be used in the processing portion 202. The transistor has an extremely low off-state current; therefore, with use of the transistor as a switch for retaining electric charge (data) which flows into a capacitor functioning as a memory element, a long data retention period can be ensured. When at least one of a register and a cache memory included in the processing portion 202 has such a feature, the processing portion 202 can be operated only when needed, and otherwise can be off while information processed immediately before turning off the processing portion 202 is stored in the memory element. In other words, normally-off computing is possible and the power consumption of the document retrieval system can be reduced.

In this specification and the like, a transistor including an oxide semiconductor in its channel formation region is referred to as an Oxide Semiconductor transistor (OS transistor). A channel formation region of an OS transistor preferably includes a metal oxide.

The metal oxide included in the channel formation region preferably contains indium (In). When the metal oxide included in the channel formation region is a metal oxide containing indium, the carrier mobility (electron mobility) of the OS transistor increases. The metal oxide included in the channel formation region preferably contains an element M. The element M is preferably aluminum (Al), gallium (Ga), or tin (Sn). Other elements that can be used as the element M are boron (B), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that two or more of the above elements may be used in combination as the element M in some cases. The element M is an element having high bonding energy with oxygen, for example. The element M is an element having higher bonding energy with oxygen than indium, for example. The metal oxide included in the channel formation region preferably contains zinc (Zn). The metal oxide containing zinc is easily crystallized in some cases.

The metal oxide included in the channel formation region is not limited to the metal oxide containing indium. The metal oxide included in the channel formation region may be a metal oxide that does not contain indium and contains zinc, a metal oxide that contains gallium, or a metal oxide that contains tin, e.g., zinc tin oxide or gallium tin oxide.

Furthermore, a transistor containing silicon in a channel formation region may be used in the processing portion 202.

In the processing portion 202, a transistor containing an oxide semiconductor in a channel formation region and a transistor containing silicon in a channel formation region may be used in combination.

The processing portion 202 includes, for example, an arithmetic circuit, a central processing unit (CPU), or the like.

The processing portion 202 may include a microprocessor such as a DSP (Digital Signal Processor) or a GPU (Graphics Processing Unit). The microprocessor may be constructed with a PLD (Programmable Logic Device) such as an FPGA (Field Programmable Gate Array) or an FPAA (Field Programmable Analog Array). The processing portion 202 can interpret and execute instructions from various programs with the use of a processor to process various types of data and control programs. The programs that can be executed by the processor are stored in at least one of a memory region of the processor and the memory portion 203.

The processing portion 202 may include a main memory. The main memory includes at least one of a volatile memory such as a RAM and a nonvolatile memory such as a ROM.

A DRAM (Dynamic Random Access Memory), an SRAM (Static Random Access Memory), or the like is used as the RAM, for example, and a memory space is virtually assigned as a work space for the processing portion 202 to be used. An operating system, an application program, a program module, program data, a look-up table, and the like which are stored in the memory portion 203 are loaded into the RAM for execution. The data, program, and program module which are loaded into the RAM are each directly accessed and operated by the processing portion 202.

In the ROM, a BIOS (Basic Input/Output System), firmware, and the like for which rewriting is not needed can be stored. As examples of the ROM, a mask ROM, an OTPROM (One Time Programmable Read Only Memory), an EPROM (Erasable Programmable Read Only Memory), and the like can be given. As examples of the EPROM, a UV-EPROM (Ultra-Violet Erasable Programmable Read Only Memory) which can erase stored data by ultraviolet irradiation, an EEPROM (Electrically Erasable Programmable Read Only Memory), a flash memory, and the like can be given.

[Memory Portion 203]

The memory portion 203 has a function of storing a program to be executed by the processing portion 202. The memory portion 203 may have a function of storing a processing result generated by the processing portion 202 and data input to the input portion 201, for example. Specifically, the memory portion 203 preferably has a function of storing the graph generated in the processing portion 202 (e.g., the graph 21 described in Embodiment 1), the result of score calculation, and the like.

The memory portion 203 includes at least one of a volatile memory and a nonvolatile memory. For example, the memory portion 203 may include a volatile memory such as a DRAM or an SRAM. For example, the memory portion 203 may include a nonvolatile memory such as an ReRAM (Resistive Random Access Memory), a PRAM (Phase-change Random Access Memory), an FeRAM (Ferroelectric Random Access Memory), an MRAM (Magnetoresistive Random Access Memory), or a flash memory. The memory portion 203 may include a recording media drive such as a hard disc drive (HDD) or a solid state drive (SSD).

[Database 204]

The document retrieval system 200 may include the database 204. The database 204 has a function of storing a plurality of reference documents, for example. The method for retrieving a document of one embodiment of the present invention may be used for the plurality of reference documents stored in the database 204, for example. The database 204 may also store a concept dictionary.

Note that the memory portion 203 and the database 204 do not have to be separated from each other. For example, the document retrieval system 200 may include a memory unit that has both the functions of the memory portion 203 and the database 204.

Note that memories included in the processing portion 202, the memory portion 203, and the database 204 can each be regarded as an example of a non-transitory computer readable storage medium.

[Display Portion 205]

The display portion 205 has a function of displaying a result of processing by the processing portion 202. The display portion 205 also has a function of displaying a reference document and a result of score calculation for the reference document. The display portion 205 may also have a function of displaying a retrieval composition.

Note that the document retrieval system 200 may include an output portion. The output portion has a function of supplying data to the outside.

[Transmission Path 206]

The transmission path 206 has a function of transmitting a variety of data. The data transmission and reception among the input portion 201, the processing portion 202, the memory portion 203, the database 204, and the display portion 205 can be performed through the transmission path 206. Data of a retrieval composition, the reference document to be compared with the composition, and the like is transmitted or received through the transmission path 206, for example.

<Structure Example 2 of Document Retrieval System>

Figure 17:
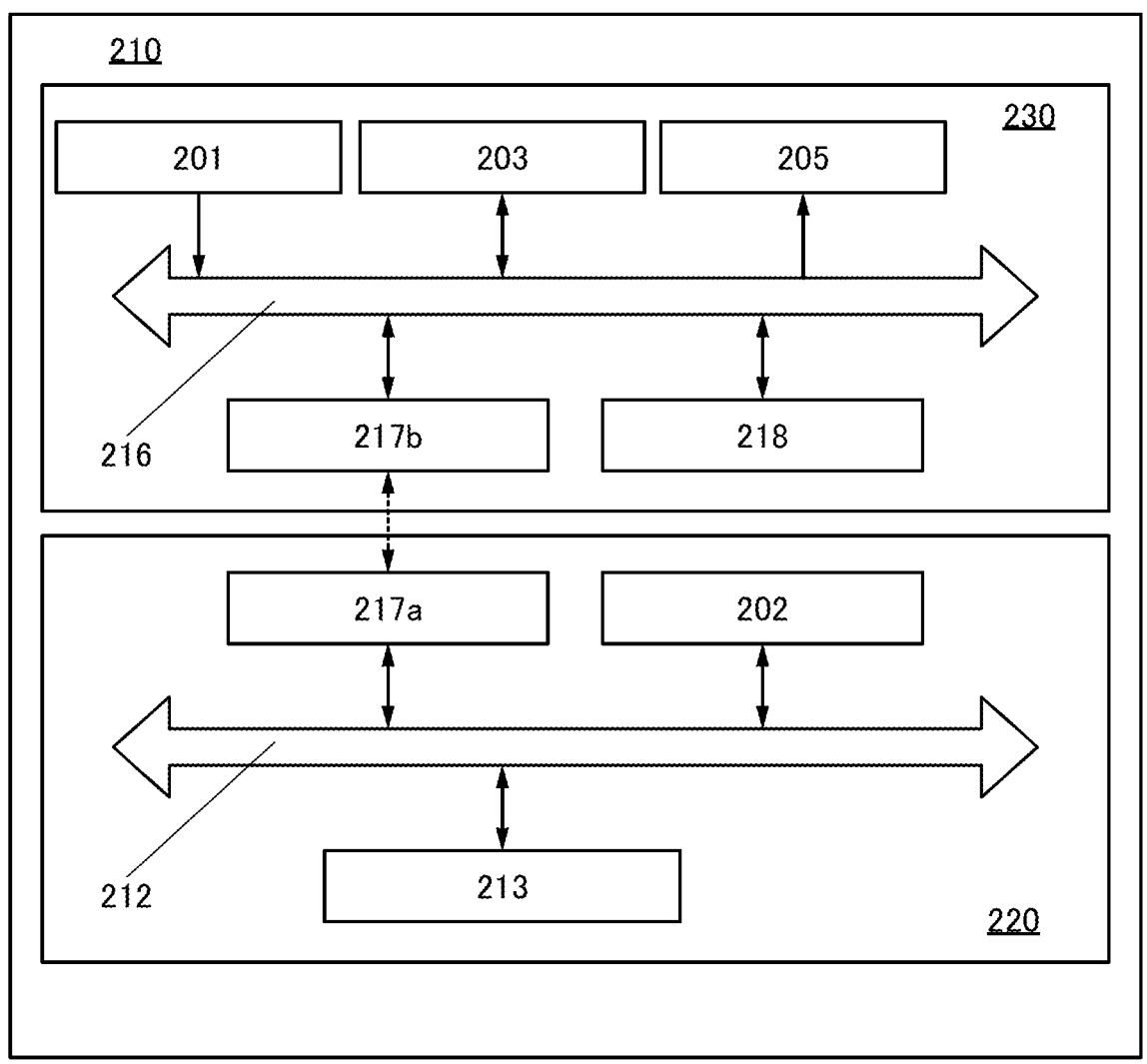
FIG. 17 is a diagram showing an example of hardware of a document retrieval system.

FIG. 17 shows a block diagram of a document retrieval system 210. The document retrieval system 210 includes a server 220 and a terminal 230 (e.g., a personal computer).

The server 220 includes a processing portion 202, a transmission path 212, a memory portion 213, and a communication portion 217a. The server 220 may further include an input/output portion or the like, although not illustrated in FIG. 17.

The terminal 230 includes the input portion 201, the memory portion 203, the display portion 205, a transmission path 216, a communication portion 217b, and a processing portion 218. The terminal 230 may further include a database or the like, although not illustrated in FIG. 17.

The user of the document retrieval system 210 inputs a composition to the input portion 201 of the terminal 230. The composition is a retrieval composition and corresponds to the composition 20 described in Embodiment 1. The composition is transmitted from the communication portion 217b of the terminal 230 to the communication portion 217a of the server 220.

The composition received by the communication portion 217a is stored in the memory portion 213 through the transmission path 212. Alternatively, the composition may be directly supplied to the processing portion 202 from the communication portion 217a.

For the creation of graphs and the analysis and evaluation of reference documents that are described in Embodiment 1, high processing capacity is required. The processing portion 202 included in the server 220 has higher processing capacity than the processing portion 218 included in the terminal 230. Thus, the creation of graphs and the analysis and evaluation of reference documents are preferably performed in the processing portion 202.

Then, a score is calculated by the processing portion 202. The score is stored in the memory portion 213 through the transmission path 212. Alternatively, the score may be directly supplied to the communication portion 217a from the processing portion 202. The score is transmitted from the communication portion 217a of the server 220 to the communication portion 217b of the terminal 230. The score is displayed on the display portion 205 of the terminal 230.

[Transmission Path 212 and Transmission Path 216]

The transmission path 212 and the transmission path 216 have a function of transmitting data. Data transmission and reception between the processing portion 202, the memory portion 213, and the communication portion 217a can be carried out through the transmission path 212. Data transmission and reception between the input portion 201, the memory portion 203, the display portion 205, the communication portion 217b, and the processing portion 218 can be carried out through the transmission path 216.

[Processing Portion 202 and Processing Portion 218]

The processing portion 202 has a function of performing processing with the use of data supplied from the memory portion 213, the communication portion 217a, or the like. The processing portion 218 has a function of performing processing with the use of data supplied from the input portion 201, the memory portion 203, the display portion 205, the communication portion 217b, or the like. The description of the processing portion 202 can be referred to for the processing portion 202 and the processing portion 218. The processing portion 202 preferably has higher processing capacity than the processing portion 218.

[Memory Portion 203]

The memory portion 203 has a function of storing a program to be executed by the processing portion 218. The memory portion 203 has a function of storing an arithmetic operation result generated by the processing portion 218, data input to the communication portion 217b, data input to the input portion 201, and the like.

[Memory Portion 213]

The memory portion 213 has a function of storing a plurality of reference documents, the processing result generated by the processing portion 202, data input to the communication portion 217a, and the like.

[Communication Portion 217a and Communication Portion 217b]

The server 220 and the terminal 230 can transmit and receive data with the use of the communication portion 217a and the communication portion 217b. As the communication portion 217a and the communication portion 217b, a hub, a router, a modem, or the like can be used. Data may be transmitted or received through wire communication or wireless communication (e.g., radio waves or infrared rays).

Note that communication between the server 220 and the terminal 230 may be performed by connecting to a computer network such as the Internet, which is an infrastructure of the World Wide Web (WWW), an intranet, an extranet, a PAN (Personal Area Network), a LAN (Local Area Network), a CAN (Campus Area Network), a MAN (Metropolitan Area Network), a WAN (Wide Area Network), or a GAN (Global Area Network).

This embodiment can be combined with the other embodiment as appropriate.

REFERENCE NUMERALS

A0: word, A1: word, A2: word, A11: word, A12: word, A21: word, A22: word, r2: value, w1: distance, w2: distance, w11: distance, w12: distance, w21: distance, w22: distance, 20: composition, 21: graph, 21A: graph, 22_$i$: node, 22_$i$1: node, 22_$i$2: node, 22_$i$3: node, 22_$n$: node, 22_$n$−1: node, 22_1: node, 22_2: node, 22_3: node, 22_4: node, 22A_$i$3: word, 22A_m1: word group, 22A_m2: word group, 22A_1: word, 23_$m$: edge, 23_$m$−1: edge, 23_1: edge, 23_2: edge, 23_3: edge, 23A_mm: word group, 24_$m$: local graph, 24_$mm$: local graph, 24_1: local graph, 24_2: local graph, 24_3: local graph, 30_1: sentence, 30_2: sentence, 30_3: sentence, 32_$i$1: node, 32_$i$2: node, 32_$i$3: node, 32A_$i$: word, 32A_$i$1: word, 32A_$i$2: word, 32A_$i$3: word, 32A_$n$: word, 32A_1: word, 33: edge, 33A: word, 40_$q$: reference document, 40_$qq$: reference document, 40_1: reference document, 40a: reference document, 40b: reference document, 40c: reference document, 40d: reference document, 41_$p$: sentence, 41_$p$1: sentence, 41_$p$2: sentence, 41_$pp$: sentence, 41_1: sentence, 41a_1: sentence, 41a_5: sentence, 41a_6: sentence, 41a_8: sentence, 41a_10: sentence, 41b_1: sentence, 41b_5: sentence, 41b_6: sentence, 41b_10: sentence, 41c_1: sentence, 41c_2: sentence, 41c_6: sentence, 41c_10: sentence, 41d_1: sentence, 41d_2: sentence, 41d_10: sentence, 61: mark, 62: mark, 63: mark, 64: mark, 64A: mark, 64B: mark, 100: document retrieval system, 101: input portion, 104: output portion, 106: processing portion, 107: memory portion, 112: concept dictionary, 200: document retrieval system, 201: input portion, 202: processing portion, 203: memory portion, 204: database, 205: display portion, 206: transmission path, 210: document retrieval system, 212: transmission path, 213: memory portion, 216: transmission path, 217a: communication portion, 217b: communication portion, 218: processing portion, 220: server, 230: terminal This application is based on Japanese Patent Application Serial No. 2020-003074 filed on Jan. 10, 2020, the entire contents are hereby incorporated herein by reference.

The invention claimed is:

1. A document retrieval system comprising:
a processing portion;
an input portion; and
an output portion,
wherein the input portion is configured to supply a retrieval composition to the processing portion,
wherein the processing portion is configured to create a retrieval graph from the retrieval composition,
wherein the retrieval graph comprises first to m-th retrieval local graphs,
wherein each of the first to m-th retrieval local graphs is constituted by two nodes and an edge between the two nodes,
wherein the processing portion is configured to retrieve a plurality of sentences from a reference document,
wherein a first sentence of the plurality of sentences comprises a first word, a second word, and a third word,
wherein the first word is one of the two nodes in one retrieval local graph of the first to m-th retrieval local graphs, a related term of the one of the two nodes in the one retrieval local graph of the first to m-th retrieval local graphs, or a hyponym of the one of the two nodes in the one retrieval local graph of the first to m-th retrieval local graphs, wherein the second word is the other of the two nodes in the one retrieval local graph of the first to m-th retrieval local graphs, a related term of the other of the two nodes in the one retrieval local graph of the first to m-th retrieval local graphs, or a hyponym of the other of the two nodes in the one retrieval local graph of the first to m-th retrieval local graphs, wherein the third word is the edge in the one retrieval local graph of the first to m-th retrieval local graphs, a related term of the edge in the one retrieval local graph of the first to m-th retrieval local graphs, or a hyponym of the edge in the one retrieval local graph of the first to m-th retrieval local graphs, wherein the processing portion is configured to assign a first mark to a score of the reference document in accordance with a similarity between the retrieval graph and the number of sentences included in the reference document among the plurality of sentences which include the two nodes and the edge of each of the first to m-th retrieval local graphs, wherein m is an integer of greater than or equal to 2, and wherein the output portion is configured to supply the score of the reference document.

2. The document retrieval system according to claim 1, wherein the processing portion is configured to assign, when the reference document comprises a second sentence of the plurality of sentences including the first word, the second word, and the third word and a third sentence of the plurality of sentences including the first word, the second word, and the third word, a second mark to the score of the reference document in accordance with a distance between the second sentence of the plurality of sentences and the third sentence of the plurality of sentences; and wherein the processing portion is configured to calculate the score of the reference document in accordance with the first mark and the second mark assigned to the score of the reference document.

3. The document retrieval system according to claim 1, wherein the output portion is configured to output the score as visual information to a memory portion.

4. A document retrieval system comprising:
a processing portion;
an input portion; and
an output portion,
wherein the input portion is configured to supply a retrieval composition to the processing portion,
wherein the processing portion is configured to create a retrieval graph from the retrieval composition,
wherein the retrieval graph comprises first to m-th retrieval local graphs,
wherein each of the first to m-th retrieval local graphs is constituted by two nodes and an edge between the two nodes,
wherein the processing portion is configured to retrieve a plurality of sentences from a reference document,
wherein a first sentence of the plurality of sentences comprises a first word, a second word, and a third word,
wherein the first word is a related term of one of the two nodes in one retrieval local graph of the first to m-th retrieval local graphs or a hyponym of the one of the two nodes in the one retrieval local graph of the first to m-th retrieval local graphs, wherein the second word is a related term of the other of the two nodes in the one retrieval local graph of the first to m-th retrieval local graphs or a hyponym of the other of the two nodes in the one retrieval local graph of the first to m-th retrieval local graphs, wherein the third word is the edge in the one retrieval local graph of the first to m-th retrieval local graphs, a related term of the edge in the one retrieval local graph of the first to m-th retrieval local graphs, or a hyponym of the edge in the one retrieval local graph of the first to m-th retrieval local graphs, wherein the processing portion is configured to assign a first mark to a score of the reference document in accordance with a similarity between the retrieval graph and the number of sentences included in the reference document among the plurality of sentences which include the two nodes and the edge of each of the first to m-th retrieval local graphs, wherein m is an integer of greater than or equal to 2, and wherein the output portion is configured to supply the score of the reference document.

5. The document retrieval system according to claim 4, wherein the output portion is configured to output the score as visual information to a memory portion.

6. A document retrieval system comprising:
a processing portion;
an input portion; and
an output portion,
wherein the input portion is configured to supply a retrieval composition to the processing portion,
wherein the processing portion is configured to create a retrieval graph from the retrieval composition,
wherein the retrieval graph comprises first to m-th retrieval local graphs,
wherein each of the first to m-th retrieval local graphs is constituted by two nodes and an edge between the two nodes,
wherein the processing portion is configured to retrieve a plurality of sentences from a first reference document of a plurality of reference documents and a plurality of sentences from a second reference document of the plurality of reference documents,
wherein a first sentence of the plurality of sentences of the first reference document of the plurality of reference documents comprises a first word, a second word, and a third word,
wherein a first sentence of the plurality of sentences of the second reference document of the plurality of reference documents comprises the first word, the second word, and the third word,
wherein the first word is one of the two nodes in one retrieval local graph of the first to m-th retrieval local graphs, a related term of the one of the two nodes in the one retrieval local graph of the first to m-th retrieval local graphs, or a hyponym of the one of the two nodes in the one retrieval local graph of the first to m-th retrieval local graphs, wherein the second word is the other of the two nodes in the one retrieval local graph of the first to m-th retrieval local graphs, a related term of the other of the two nodes in the one retrieval local graph of the first to m-th retrieval local graphs, or a hyponym of the other of the two nodes in the one retrieval local graph of the first to m-th retrieval local graphs, wherein the third word is the edge in the one retrieval local graph of the first to m-th retrieval local graphs, a related term of the edge in the one retrieval local graph of the first to m-th retrieval local graphs, or a hyponym of the edge in the one retrieval local graph of the first to m-th retrieval local graphs, wherein the processing portion is configured to assign a first mark to a score of the first reference document in accordance with a similarity between the retrieval graph and the number of sentences included in the first reference document among the plurality of sentences which include the two nodes and the edge of each of the first to m-th retrieval local graphs, wherein the processing portion is configured to assign a second mark to a score of the second reference document in accordance with a similarity between the retrieval graph and the number of sentences included in the second reference document among the plurality of sentences which include the two nodes and the edge of each of the first to m-th retrieval local graphs, wherein m is an integer of greater than or equal to 2, and wherein the output portion is configured to supply the score of the first reference document and the second reference document.

7. The document retrieval system according to claim 6, wherein the output portion is configured to output the score as visual information to a memory portion.

* * * * *